(12) United States Patent
Kurita

(10) Patent No.: US 9,413,654 B2
(45) Date of Patent: Aug. 9, 2016

(54) SYSTEM, RELAY DEVICE, METHOD, AND MEDIUM

(71) Applicant: FUJITSU LIMITED, Kawasaki-shi, Kanagawa (JP)

(72) Inventor: Toshihiko Kurita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 14/163,534

(22) Filed: Jan. 24, 2014

(65) Prior Publication Data

US 2014/0286338 A1   Sep. 25, 2014

(30) Foreign Application Priority Data

Mar. 21, 2013  (JP) ................. 2013-059140

(51) Int. Cl.
*H04L 12/741* (2013.01)
*H04L 12/931* (2013.01)

(52) U.S. Cl.
CPC .............. *H04L 45/74* (2013.01); *H04L 49/356* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 9,300,574 B2 * | 3/2016 | Ditya .................. | H04L 45/44 |
| 2002/0141340 A1 * | 10/2002 | Tamura ................ | H04L 41/064 |
| | | | 370/231 |
| 2002/0178289 A1 * | 11/2002 | Kurose ............. | H04L 29/12009 |
| | | | 709/245 |
| 2004/0125815 A1 | 7/2004 | Shimazu et al. | |
| 2011/0274110 A1 * | 11/2011 | Mmmadi ................ | H04L 49/30 |
| | | | 370/392 |
| 2013/0034094 A1 | 2/2013 | Cardona et al. | |
| 2013/0044629 A1 * | 2/2013 | Biswas ............... | H04L 67/2804 |
| | | | 370/254 |
| 2013/0117766 A1 * | 5/2013 | Bax ......................... | G06F 13/14 |
| | | | 719/323 |
| 2014/0185611 A1 * | 7/2014 | Lie .......................... | H04L 49/25 |
| | | | 370/355 |

FOREIGN PATENT DOCUMENTS

| | | |
|---|---|---|
| JP | 2001-325241 | 11/2001 |
| JP | 2003-218910 | 7/2003 |
| JP | 2004-32602 | 1/2004 |

OTHER PUBLICATIONS

Extended European Search Report in corresponding European Application No. 14153625.0 dated May 16, 2014.

* cited by examiner

*Primary Examiner* — Hassan Kizou
*Assistant Examiner* — Deepa Belur
(74) *Attorney, Agent, or Firm* — Staas & Halsey LLP

(57) ABSTRACT

A system includes a first device which outputs a packet including an address identifying a second device and identifier of one of a plurality of communication circuits that output packets to a network, and a relay device which outputs the packet to the second device instead of to the one of the plurality of communication circuits corresponding to the identifier, when it is determined based on the address that the second device is coupled to the relay device.

18 Claims, 16 Drawing Sheets

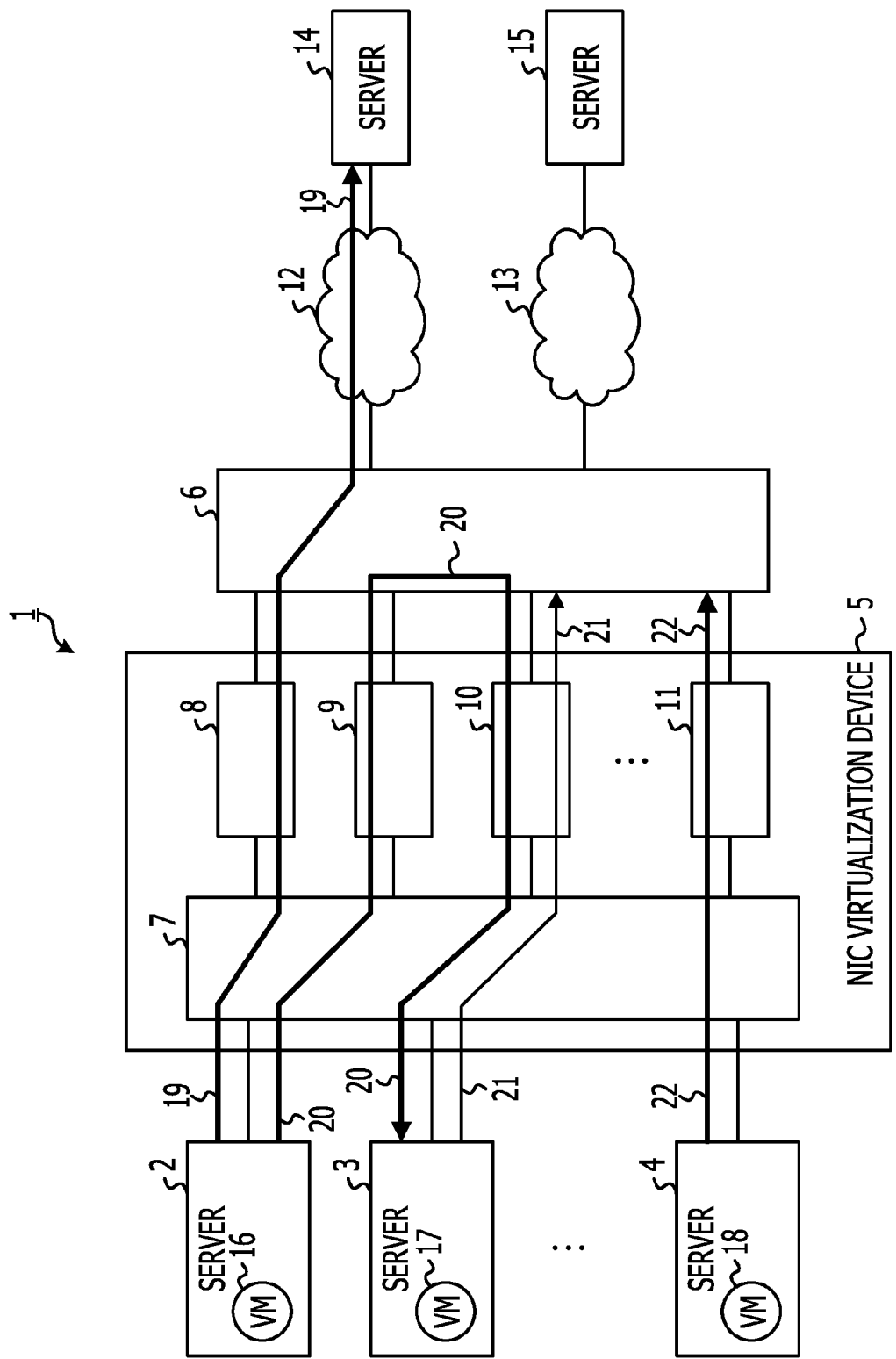

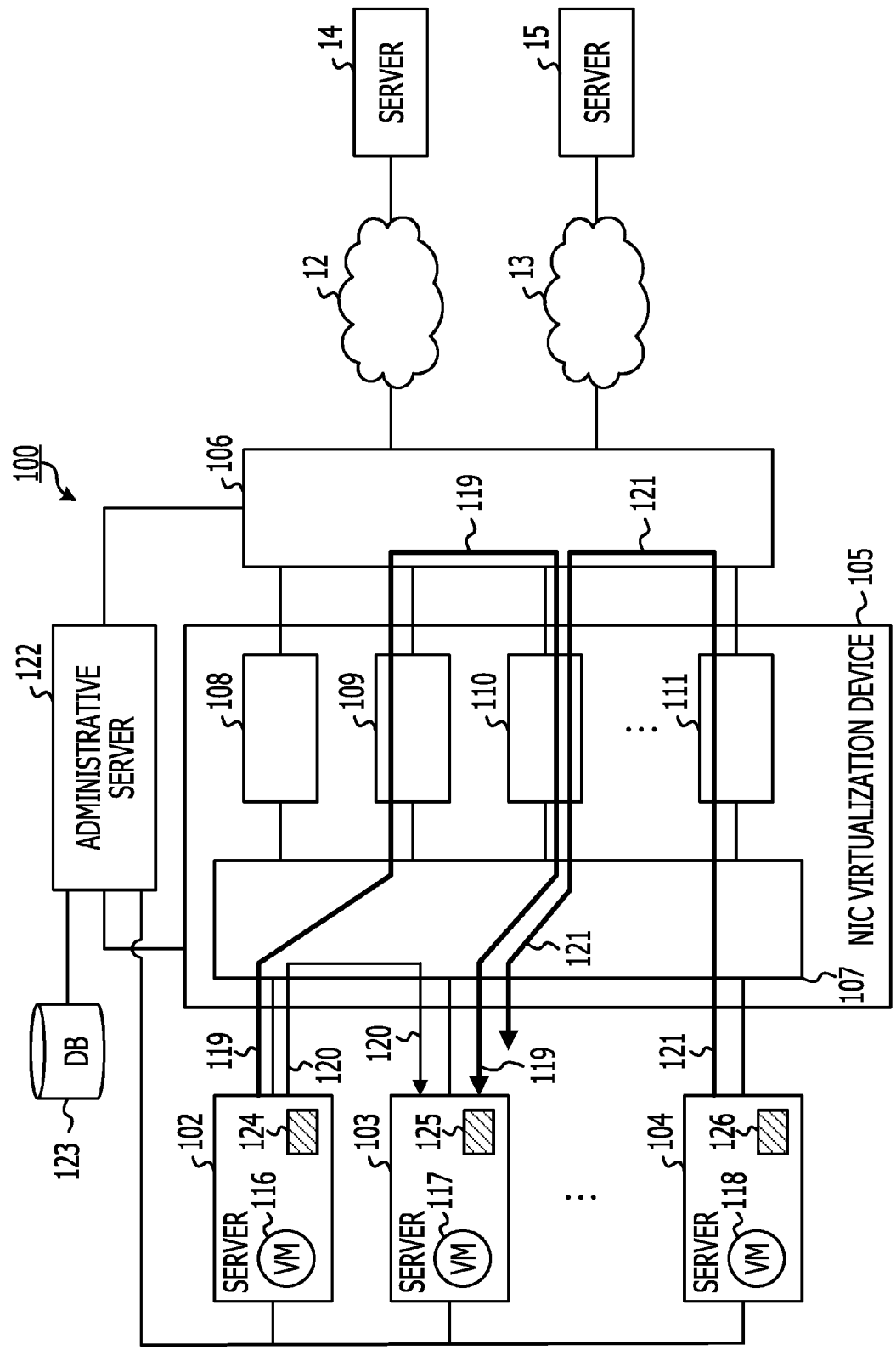

FIG. 3A

| DEVICE IDENTIFICATION INFORMATION (SLAVE) | DEVICE IDENTIFICATION INFORMATION (MASTER) | TARGET ADDRESS | SOURCE ADDRESS | SEQUENCE NO. | DATA |

FIG. 3B

| TARGET ADDRESS | SOURCE ADDRESS | SEQUENCE NO. | DATA |

FIG. 3C

| VIRTUAL DEVICE IDENTIFICATION INFORMATION | DEVICE IDENTIFICATION INFORMATION | TARGET ADDRESS | SOURCE ADDRESS | SEQUENCE NO. | DATA |

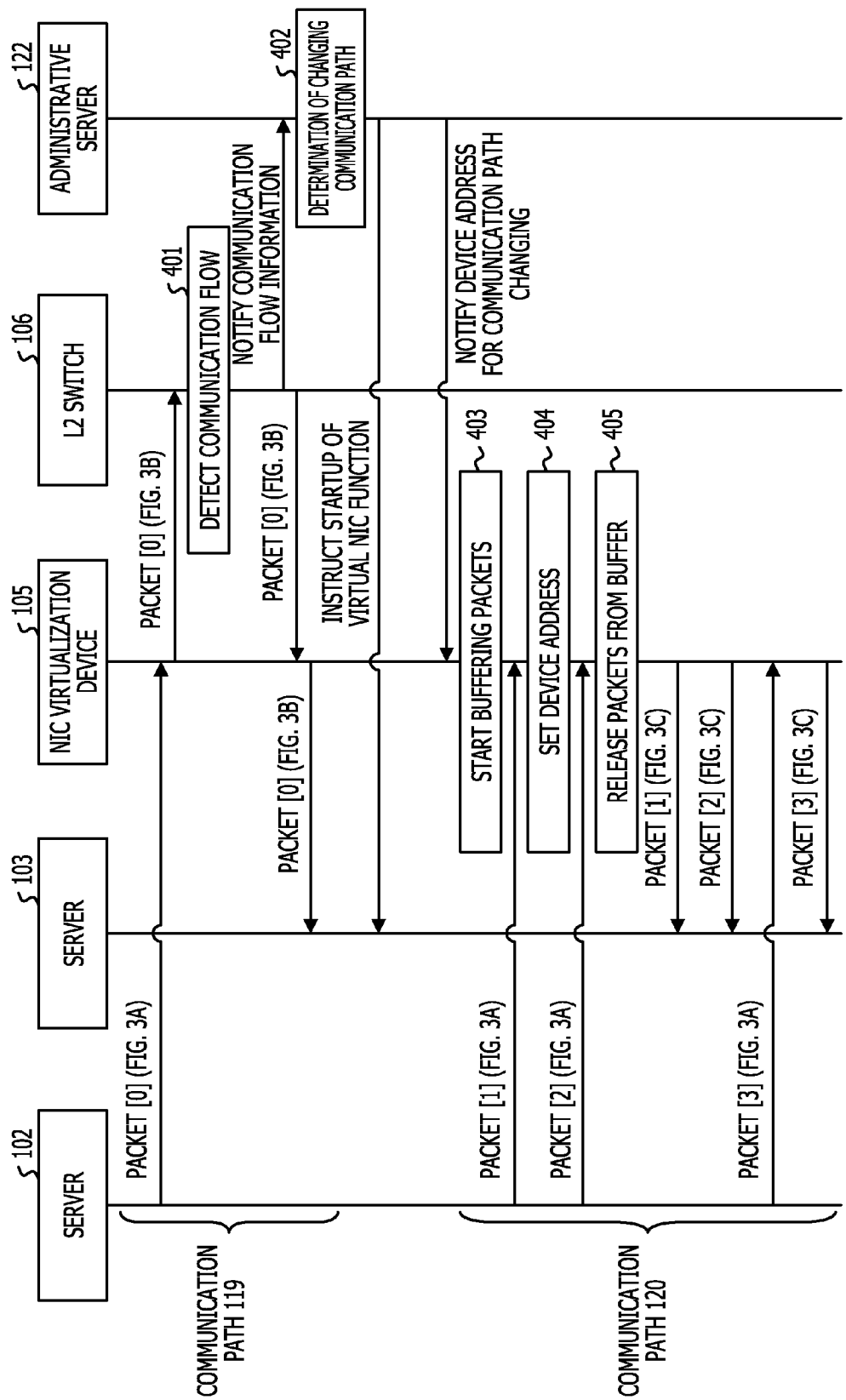

FIG. 7A

| DEVICE ADDRESS | DEVICE IDENTIFICATION INFORMATION |
|---|---|
| 00-90-27-AA-74-E0 | #001 |
| ... | ... |

FIG. 7B

| TARGET ADDRESS | SOURCE ADDRESS | DESCRIPTION |
|---|---|---|
| 00-90-27-AA-74-E0 | 00-90-27-BB-86-E2 | SYSTEM PROVIDER A |
| ... | ... | ... |

FIG. 7C

| DEVICE ADDRESS | VIRTUAL DEVICE IDENTIFICATION INFORMATION |
|---|---|
| 00-90-27-AA-74-E0 | #1001 |
| 00-90-27-BB-86-E2 | #1002 |
| ... | ... |

FIG. 7D

| TARGET ADDRESS | SOURCE ADDRESS | VIRTUAL DEVICE IDENTIFICATION INFORMATION |
|---|---|---|
| 00-90-27-AA-74-E0 | 00-90-27-BB-86-E2 | #1001 |
| 00-90-27-AA-74-E1 | ALL | #1003 |
| ... | ... | ... |

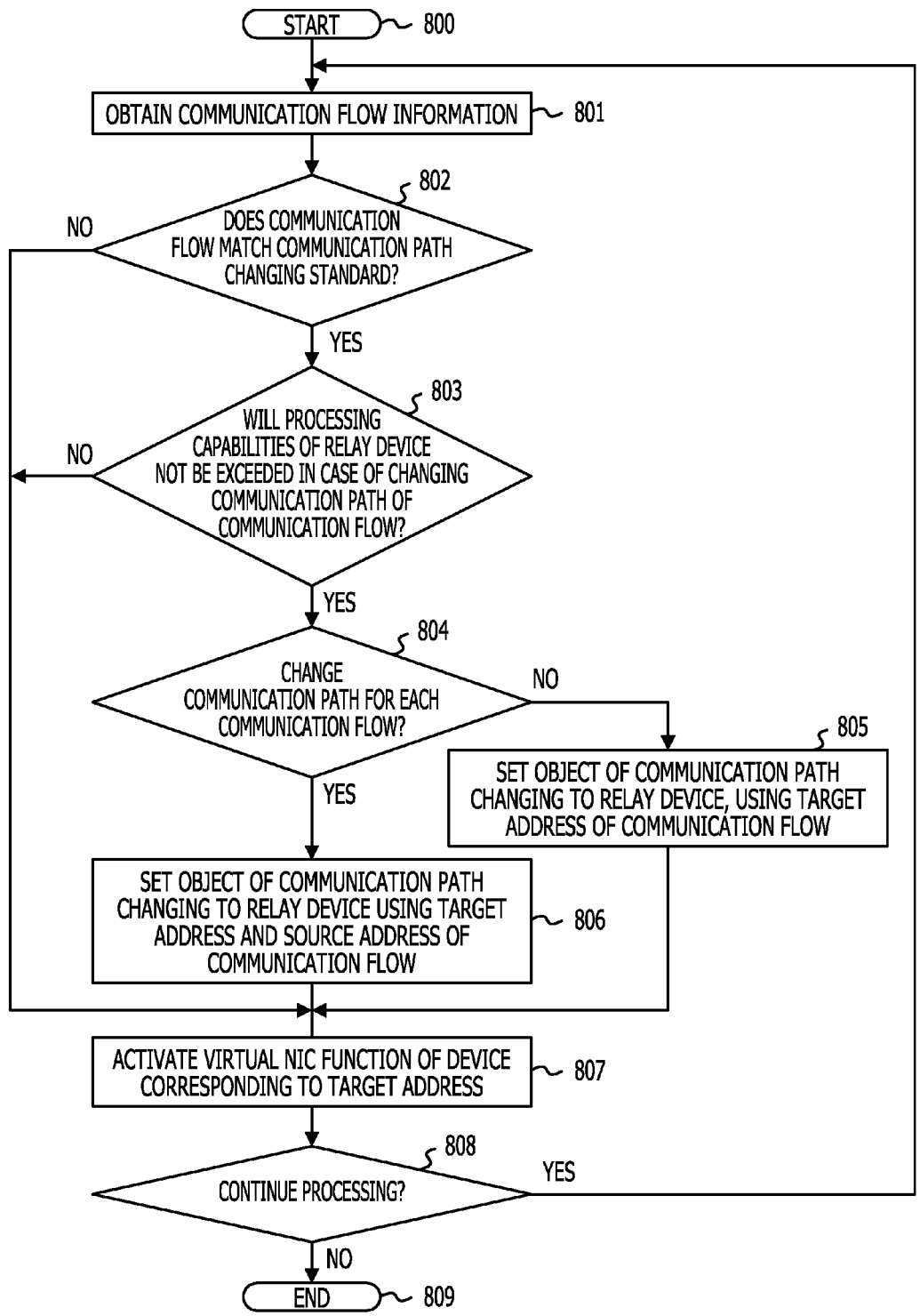

FIG. 14A

| DEVICE IDENTIFICATION INFORMATION | PORT NO. |
|---|---|
| #001 | 3 |
| #002 | 5 |
| ... | ... |

FIG. 14B

| TARGET ADDRESS | SOURCE ADDRESS | VIRTUAL DEVICE IDENTIFICATION INFORMATION | DEVICE IDENTIFICATION INFORMATION |
|---|---|---|---|
| 00-90-27-AA-74-E0 | 00-90-27-BB-86-E2 | #1001 | #001 |
| 00-90-27-AA-74-E1 | ALL | #1002 | #002 |
| ... | ... | ... | ... |

FIG. 14C

| VIRTUAL DEVICE IDENTIFICATION INFORMATION | PORT NO. |
|---|---|
| #1001 | 10 |
| #1002 | 11 |
| ... | ... |

SYSTEM, RELAY DEVICE, METHOD, AND MEDIUM

CROSS-REFERENCE TO RELATED APPLICATION

This application is based upon and claims the benefit of priority from the prior Japanese Patent Application No. 2013-059140 filed on Mar. 21, 2013, the entire contents of which are incorporated herein by reference.

FIELD

The embodiment discussed herein is related to a system, a relay device, a method, and a medium.

BACKGROUND

Packets are transmitted from a server to a network after packet processing is performed by a network interface card (NIC) which the server has. Accordingly, the transmission rate of packets output to the network does not exceed a band limitation which is based on the processing capabilities of the NIC.

There are cases where multiple NICs are installed in a server and used at the same time, to realize a transmission rate exceeding the band limitation of a single NIC. In this case, bandwidth corresponding to the number of NICs used at the same time may be realized. If a transmission rate exceeding the processing capabilities of the multiple NICs already provided to the server is to be realized, a new NIC server is added.

Now, there is known a technique to virtualize NICs, as part of a technique to virtualize resources of information processing devices. In a case of virtualizing a NIC, a NIC does not have to be installed in the server. The server is coupled to a NIC virtualization device including multiple NICs, and switches to transfer packets to the NICs. The server outputs packets to the NIC virtualization device, specifying identification Nos. for assigned NICs out of the multiple NICs. The NIC virtualization device transfers packets to the corresponding NICs out of the multiple NICs, in accordance with the identification Nos. The NICs within the NIC virtualization device process the packets, and transmit the packets to the network.

Thus, the NIC virtualization device allows a server to user multiple NICs without physically installing more NICs to the server. Also, if a server has NICs installed, other servers will not be able to use these NICs even if there is excess processing capability. On the other hand, if there is excess in processing capability of NICs of a NIC virtualization device that are assigned to a certain server, these NICs may be also assigned to another server as well, and used in common.

There is known a technique where bypass circuits are installed between routers, usage rights are set so as to be restricted to transmission between particular terminal devices based on user contract, and router tables in the routers are rewritten so that data packets are transmitted between the particular terminal devices of which usage rights have been set via the bypass circuits.

An example of the related art is described in Japanese Laid-open Patent Publication No. 2003-218910.

SUMMARY

According to an aspect of the invention, a system includes a first device which outputs a packet including an address identifying a second device and identifier of one of a plurality of communication circuits that output packets to a network, and a relay device which outputs the packet to the second device instead of to the one of the plurality of communication circuits corresponding to the identifier, when it is determined based on the address that the second device is coupled to the relay device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is illustrates an example of a communication system;

FIG. 2 illustrates an example of a communication system according to an embodiment;

FIGS. 3A through 3C illustrate examples of packet processing by the communication system according to the embodiment;

FIG. 4 illustrates an example of a time chart of operations of the communication system according to the embodiment;

FIGS. 7A through 7D illustrate examples of information used by the administrative device according to the embodiment;

FIG. 8 illustrates an example of processing executed at the administrative device according to the embodiment;

FIGS. 14A through 14C illustrate examples of information used by the relay device according to the embodiment;

DESCRIPTION OF EMBODIMENT

Figure 5:
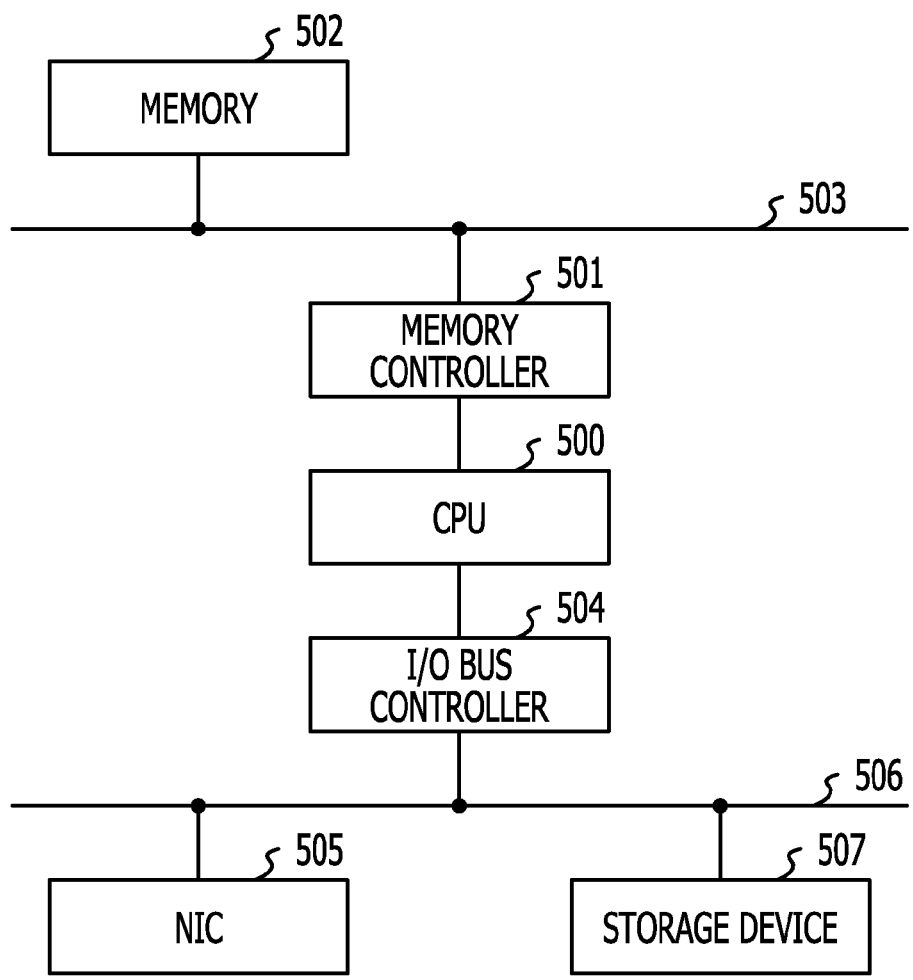
FIG. 5 illustrates an example of a hardware configuration of an administrative device according to the embodiment.

The inventor has observed that in a case of delivering packets to a target device via a communication circuit transmitting packets to a network, communication efficiency is restricted by band limitation at the communication circuit.

According to a later-described embodiment, communication efficiency is improved by changing the planned communication path for packets delivered to the target device over the communication path delivering packets to the network, in accordance with the address of the target device.

FIG. 1 illustrates an example of a communication system. A communication system 1 includes servers 2 through 4, a network interface card (NIC) virtualization device 5, and an L2 switch 6. The NIC virtualization device 5 includes a bus switch 7 and NICs 8 through 11. The servers 2 through 4 do not have NICs, and communicate with a server 14 and server 15 via a network 12 and network 13 by one of the NICs 8 through 11 of the NIC virtualization device 5 being assigned thereto. We will say that virtual machines (VM) 16 through 18 are being executed at the servers 2 through 4, respectively.

In a case of the VM 16 transmitting packets to the server 14 over the communication path 19, The VM 16 outputs packets to the bus switch 7, and the bus switch 7 outputs the packets to the NIC 8 assigned to the VM 16. The NIC 8 outputs the packets to the L2 switch 6, and the L2 switch 6 outputs the packets to the network 12 so that the packets will reach the communication target server 14.

In more detail, the VM 16 gives the data to be transmitted the address of the target device and the address of the source device. In a case of communication by this communication path 19, the VM 16 packetizes the data using the media access control (MAC) address of the target server 14 as the target MAC address, and the MAC address of the VM 16 as the source MAC address. The VM 16 further includes device information to identify the NIC 8 assigned to itself, in the header portion.

The servers 2 through 4 and the bus switch 7 perform communication over an internal wiring bus, so the VM 16 serves as a master and the NIC 8 serves as a slave. The VM 16 serving as a master notifies the NIC 8 serving as a slave that packets will be output, before outputting the packets. If able to receive the packets, the NIC 8 serving as a slave notifies the VM 16 serving as a master that it is able to receive the packets. The VM 16 serving as a master then outputs packets, including device information to identify the NIC 8, to the bus switch 7.

The bus switch 7 holds information of which port of the bus switch 7 which NIC is coupled to. For example, the bus switch 7 holds information correlating the port Nos. of the bus switch 7 and device identification information. Upon receiving a packet including device information to identify the NIC 8, the bus switch 7 determines the port No. corresponding to the device identification information included in the header portion of the packet. The bus switch 7 controls switch circuits such as a crossbar switch included in the bus switch 7 to transfer the packets to the determined port. The packets are then output from the port determined at the bus switch 7.

The determined port is coupled to the NIC 8, so packets reach the NIC 8 serving as a slave. Upon receiving the packets, the NIC 8 strips the packets of the device identification information in the header portion by depacketizing, and outputs the packets to the L2 switch 6 in accordance with the target MAC address. The L2 switch 6 outputs the packets to the port correlated with the target MAC address, and thus the packets are delivered to the server 14 over the network 12.

Also, in the event that the VM 16 transmits packets to the VM 17 via a communication path 20, the VM 16 outputs the packets to the bus switch 7, and the bus switch 7 outputs these packets to the NIC 9 assigned to the VM 16. The NIC 9 outputs these packets to the L2 switch 6, and the L2 switch 6 outputs the packets to the NIC 10 so that the packets will reach the VM 17 which is the communication target. The NIC 10 outputs the packets to the bus switch 7, and the bus switch 7 outputs the packets to the VM 17.

In more detail, the VM 16 packetizes the data to be transmitted using the MAC address of the target VM 17 as the target MAC address, and the MAC address of the VM 16 as the source MAC address. The VM 16 further includes device information to identify the NIC 9 assigned to itself, in the header portion.

The servers 2 through 4 and the bus switch 7 perform communication over an internal wiring bus, so the VM 16 serves as a master and the NIC 9 serves as a slave. The VM 16 serving as a master notifies the NIC 9 serving as a slave that packets will be output, before outputting the packets. If able to receive the packets, the NIC 9 serving as a slave notifies the VM 16 serving as a master that it is able to receive the packets. The VM 16 serving as a master then outputs packets, including device information to identify the NIC 9, to the bus switch 7.

Upon receiving a packet including device information to identify the NIC 9, the bus switch 7 determines the port No. corresponding to the device identification information included in the header portion of the packet. The bus switch 7 controls switch circuits such as a crossbar switch included in the bus switch 7 to transfer the packets to the determined port. The packets are then output from the port determined at the bus switch 7.

The determined port is coupled to the NIC 9, so packets reach the NIC 9 serving as a slave. Upon receiving the packets, the NIC 9 strips the packets of the device identification information in the header portion by depacketizing, and outputs the packets to the L2 switch 6 in accordance with the target MAC address.

The L2 switch 6 outputs the packets to the port correlated with the target MAC address. In this case, the port correlated with the MAC address of the VM 17 is the port to which the NIC 10 is coupled, so packets are output from the port to which the NIC 10 is coupled.

Upon receiving the packets, the NIC 10 serving as a slave in this communication through the internal wiring bus notifies the VM 17 serving as a master that packets have arrived, of which the VM 17 is the destination. If able to receive these packets, the VM 17 serving as a master notifies the NIC 10 serving as a slave that it may output the packets, since the packets may be received. Upon receiving this notification, the NIC 10 serving as a slave includes device identification information to identify the I/O bus controller of the server 3 for example, in the header portion of the packets, in order to identify the server 3 running the VM 17 serving as a master in the communication on the bus, and outputs the packet to the bus switch 7.

Upon receiving a packet including device information to identify the I/O bus controller of the server 3, the bus switch 7 determines the port No. corresponding to the device identification information included in the header portion of the packet. The bus switch 7 controls switch circuits such as a crossbar switch included in the bus switch 7 to transfer the packets to the determined port. The packets are then output from the port determined at the bus switch 7.

The determined port is coupled to the I/O bus controller of the server 3, so the packets reach the VM 17 serving as a master by being transmitted to the server 3.

As described above, communication between the servers 2 through 4 and NICs 8 and 9 is over a bus which is internal wiring, so the servers 2 through 4 and VMs 16 through 18 serve as masters and the NICs 8 through 11 serve as slaves to carry out communication according to the device identification information. On the other hand, communication between the NICs 8 through 11 and L2 switch 6 is executed following MAC addresses.

Additionally, the VM 17 is assigned the NIC 10 and transmits packets over a communication path 21. The VM 18 is assigned the NIC 11 and transmits packets over a communication path 22.

Note that the servers 2 through 4 which do not have NICs are coupled to the bus switch 7 by a sub which is internal wiring. Accordingly, the band of communication between the servers 2 through 4 and the bus switch 7 is 56 Gbps for example, since it is communication over internal wiring. On the other hand, the band of communication between the NICs 8 through 11 and the L2 switch 6 is 1 Gbps for example, since it is dependent on the band limitation of the NICs, which is narrower than communication over internal wiring.

That is to say, the band of the communication path 20 described above will be restricted by the band limitations of the NICs 9 and 10.

FIG. 2 illustrates an example of a communication system according to an embodiment. A communication system 100 according to the embodiment includes servers 102 through 104, an NIC virtualization device NIC virtualization device 105, a L2 switch 106, an administrative server 122, and a database 123. The NIC virtualization device 105 which is an example of a relay device includes a bus switch 107, and NICs 108 through 111 which are example of communication circuits. The servers 102 through 104 do not have NICs, and communicate with each other and with server 14 and server 15 via network 12 and network 13 by one of the NICs 108 through 111 of the NIC virtualization device 105 being assigned thereto. That is to say, the existence of the NIC virtualization device 105 enables communication of a desired band to be executed by NICs being adaptively assigned, independent of physical connections between the NICs and servers.

Description hereinafter will be made by example of communication between VMs 116 through 118 executed at the servers 102 through 104 respectively, but embodiments are not restricted to this, and may be applied to communication between the servers 102 through 104 which are physical server. The VMs 116 through 118 and servers 102 through 104 are examples of source devices and target devices.

The administrative server 122 is coupled to the servers 102 through 104, NIC virtualization device 105, L2 switch 106, and database 123. The administrative server 122 has a VM manager function to deploy, transfer, and delete the VMs 116 through 118 executed and the servers 102 through 104. The administrative server 122 also gives the VMs 116 through 118 each MAC addresses for identification of the VMs 116 through 118, and manages the MAC addresses. Further, the administrative server 122 assigns the NICs 108 through 111 to the VMs 116 through 118 and servers 102 through 104, and manages the assignation. The administrative server 122 manages the correlation between the MAC addresses given to the VMs 116 through 118 and the device identification information of the NICs 108 through 111 assigned to the VMs 116 through 118 as with the information illustrated in FIG. 7A described later, for example, and stores this in the database 123.

The servers 102 through 104 of the communication system 100 according to the embodiment have virtual NIC functions 124 through 126, so that the servers 102 through 104 function as slaves in communication over the bus which is internal wiring, at the time of performing the communication not going through the NICs 108 through 111. For example, upon receiving notification from a device serving as a master in bus communication that packets are to be transmitted, the servers 102 through 104 may transmit a response indicating acceptance of the packets to the device serving as a master, by way of the virtual NIC functions 124 through 126.

The administrative server 122 gives the servers 102 through 104 virtual device identification information to identify the servers 102 through 104 as slave devices in communication over the bus which is internal wiring, so that the servers 102 through 104 will be able to accept packets as slave devices. The administrative server 122 manages the correlation between the MAC addresses given to the VMs 116 through 118 and the virtual device identification given to the servers 102 through 104 as with the information illustrated in FIG. 7C described later, for example, in order to manage the virtual device identification information of the servers 102 through 104 where the VMs 116 through 118 are being executed, and stores this in the database 123.

Note that at the time of making settings so as to not go through the NICs 108 through 111, the administrative server 122 obtains communication flow information of target MAC address and source MAC address of packets from the L2 switch 106, and determines a communication flow as being identified by target address and source address.

The administrative server 122 then determines whether or not the communication flow satisfies a standard for settings so as to not go through the NICs 108 through 111, in accordance with the standard of FIG. 7B described later. In the event that the communication flow is such that the communication path may be switched so as to not go through the NICs 108 through 111, the administrative server 122 notifies the bus switch 107 of the target MAC address and source MAC address of the packets, to change the communication path.

Now, in a case of the VM 116 transmitting packets to the VM 117 via the communication path 119, the VM 116 outputs packets to the bus switch 107, and the bus switch 107 outputs the packets the NIC 109 assigned to the VM 116. The NIC 109 outputs the packets to the L2 switch 106, and the L2 switch 106 outputs the packets to the NIC 110 so as to arrive at the VM 117 which is the communication target. the NIC 110 then outputs the packets to the bus switch 107, and the bus switch 107 outputs the packets to the VM 117.

In further detail, the VM 116 packetizes the data using the MAC address of the target VM 117 as the target MAC address, and the MAC address of the VM 116 as the source MAC address, as illustrated in the packet overview in FIG. 3B.

The server 102, the bus switch 107, and the NIC 109 perform communication over the bus which is internal wiring, so the server 102 running the VM 116 serves as a master and the NIC 109 serves as a slave. The VM 116 adds device identification information for identifying the server 102 executing the VM 116 in bus communication, to the packets as master device identification information, as illustrated in the packet overview in FIG. 3A. The device identification information of the I/O bus controller included in the server 102 may be used for the master device identification information. Further, the VM 116 adds device identification information for identifying the NIC 109 assigned to the VM 116 in bus communication, to the packets as slave device identification information, as illustrated in the packet overview in FIG. 3A.

The VM 116 serving as a master notifies the NIC 109 serving as a slave that packets will be output, before outputting the packets from the server 102 serving as a master. If able to receive the packets, the NIC 109 serving as a slave notifies the server 102 running the VM 116 serving as a master that it is able to receive the packets.

The VM 116 then outputs packets, including device identification information to identify the NIC 109, to the bus switch 107. An example of this packet overview is illustrated in FIG. 3A.

Upon receiving a packet including the device identification information to identify the NIC 109 and target MAC address, the bus switch 107 confirms several bits worth after the device identification information included in the packet, up to where the target MAC address and source MAC address may be determined. The bus switch 107 then determines which of the target AMC addressees set by the administrative server 122 this target MAC address corresponds to. A case where the communication path 119 is selected is an example of a case where the target MAC address included in the packet corresponds to none of the target MAC addresses set by the administrative server 122.

The bus switch 107 in this case determines the port No. corresponding to the device identification information included in the packet. The bus switch 107 controls switch circuits such as a crossbar switch included in the bus switch 107 to transfer the packets to the determined port. The packets are then output from the port determined at the bus switch 107.

The determined port is coupled to the NIC 109, so packets reach the NIC 109 serving as a slave. Upon receiving the packets, the NIC 109 strips the packets of the device identification information in the header portion by depacketizing, as illustrated in the packet overview in FIG. 3B, and outputs the packets to the L2 switch 106 in accordance with the target MAC address. The L2 switch 106 outputs the packets to the port correlated with the target MAC address. In this case, the port correlated with the MAC address of the VM 117 is coupled to the NIC 110, so packets are output from the port to which the NIC 110 is coupled. In the event that transfer of packets to the part where the NIC 110 is coupled within the L2 switch 106 is not available due to virtual local area network (VLAN) settings at the L2 switch 106, the packets are output to the network 12 or network 13. The communication is then returned by a switched in the network 12 or network 13, and the packets are input to a port at the L2 switch 106 capable of transfer to the port to which the NIC 110 is coupled.

Upon receiving the packets, the NIC 110 serving as a slave in the communication over the bus which is internal wiring, notifies the server 103 serving as a master running the VM 117 that packets have arrived of which the destination is the VM 117. If able to receive these packets, the server 103 serving as a master notifies the NIC 110 serving as a slave that it may output the packets, since the packets may be received.

Upon receiving this notification, the NIC 109 serving as a slave outputs packets to the bus switch 107. These packets are given device identification information such as information to determine the I/O bus controller of the server 103 for example, to determine the server 103 serving as a master in the communication over the bus, as master identification information, and device identification information of the NIC 109 as slave identification information. An example of this packet overview is illustrated in FIG. 3A.

Upon receiving a packet including device information to determine the I/O bus controller of the server 103, the bus switch 107 determines the port No. corresponding to the device identification information included in the header portion of the packet. The bus switch 107 controls switch circuits such as a crossbar switch included in the bus switch 107 to transfer the packets to the determined port. The packets are then output from the port determined at the bus switch 107. The determined port is coupled to the I/O bus controller of the server 103, so the packets reach the VM 117 serving as a master by being transmitted to the server 103.

A case of the VM 118 transmitting packets to the VM 117 via the communication path 121 involves substantially the same procedures as the above-described case of the VM 116 transmitting packets to the VM 117 via the communication path 119, so description thereof will be omitted.

A case of the VM 116 transmitting packets to the VM 117 via the communication path 120 will be described. In this case, the VM 116 outputs packets to the bus switch 107, and the bus switch 107 outputs the packets from the port where the VM 117 is coupled, instead of outputting to the NIC 109 where the VM 116 is assigned. Thus, packets intended to be delivered to the VM 117 are delivered to the VM 117 without going through the NIC 109.

In further detail, the VM 116 packetizes the data using the MAC address of the target VM 117 as the target MAC address, and adding the MAC address of the VM 116 to data to be transmitted as the source MAC address, as illustrated in the packet overview in FIG. 3B.

The VM 116 adds device identification information for identifying the server 102 running the VM 116 in bus communication, to the packets as master device identification information, as illustrated in the packet overview in FIG. 3A. Note that the device identification information of the I/O bus controller included in the server 102 may be used as the master device identification information. Further, the VM 116 adds device identification information for identifying the NIC 109 assigned to the VM 116 in bus communication, to the packets as slave device identification information, as illustrated in the packet overview in FIG. 3A.

Before the packets are output from the server 102 serving as a master, the VM 116 outputs a notification to the bus switch 107, to notify the NIC 109 serving as a slave that the packets will be output. This notification includes information where device identification information for identifying the server 102 running the VM 116 has been used as the master device identification information, device identification information for identifying the NIC 109 has been used as the slave device identification information, the MAC address of the VM 117 has been used as the target MAC address, the MAC address of the VM 116 has been used as the source MAC address, and information indicating this is a notification before transmitting the packets. An example of this packet overview is illustrated in FIG. 3A.

Upon receiving a notification including device identification information to determine the NIC 109 serving as a slave, a target MAC address, and a source MAC address, the bus switch 107 confirms several bits worth after the slave device identification information included in the packet, up to where the target MAC address and source MAC address may be determined. The bus switch 107 then determines whether or not this target MAC address corresponds to at least any of the target MAC addressees set by the administrative server 122. Now, an arrangement may be made here where whether or not the source target MAC address corresponds to any of the target MAC addressees set by the administrative server 122 is determined, and switching of the communication path is changed for each flow. A case where the communication path 120 is selected is an example of a case where the target MAC address corresponds to any one of the target MAC addresses set by the administrative server 122.

In this case, the bus switch 107 sets virtual device identification information to the notification, by replacing the slave device identification information included in the notification with virtual device identification information corresponding to the target MAC address. An example of an overview of this notification is illustrated in FIG. 3C. This virtual device identification information is information provided so that the target VM or server may be recognized as a slave, in order to deliver the notification and packets to the target device on the bus communication path without going through the NICs 108 through 111.

The bus switch 107 confirms that the VM 117 is being run on the server 103 based on the target MAC address, obtains the virtual device identification information set to the server 103, and replaces the device identification information included in the notification with the virtual device identification information, for example. The bus switch 107 then determines the port No. corresponding to the virtual device identification information included in the notification.

The bus switch 107 controls switch circuits such as a crossbar switch included in the bus switch 107 to transfer the notification to the determined port. The notification is then output from the port determined at the bus switch 107. The determined port is coupled to the server 103 serving as a slave.

As described above, the server 103 serving as a slave has a slave function 125 in bus communication based on the virtual device identification information. Upon the notification including the virtual device identification information being output from the bus switch 107 to the server 103 serving as a slave, the server 103 serving as a slave receives this notification, and the packets are delivered to the VM 117.

Next, if the VM 117 is able to accept the packets, a response to that effect is transmitted from the server 103 serving as a slave to the server 102 serving as a master.

For example, the VM 117 outputs a response to the bus switch 107. This response includes information where device identification information for identifying the server 102 running the VM 116 has been used as the master device identification information, virtual device identification information set to the server 103 has been used as the slave device identification information, the MAC address of the VM 116 has been used as the target MAC address, the MAC address of the VM 117 has been used as the source MAC address, and information indicating the packets may be received. An example of this packet overview is illustrated in FIG. 3C.

Upon receiving this response, the bus switch 107 confirms several bits worth after the device identification information included in the response, up to where the target MAC address and source MAC address may be determined. The bus switch 107 then determines whether or not this target MAC address corresponds to any of the target MAC addressees set by the administrative server 122. The MAC address of the VM 117 which is the target of the packets is the source MAC address in the response, so the bus switch 107 determines the address based on the source MAC address included in the response. Now, an arrangement may be made here where whether or not the source target MAC address corresponds to any of the source MAC addressees set by the administrative server 122 is determined, and switching of the communication path is changed for each flow.

The bus switch 107 then replaces the virtual device identification information of the slave included in the response with device identification information to identify the NIC 109 assigned to the target MAC address, and determines the port No. corresponding to the device identification information of the master included in the response. The reason of replacing with the device identification information identifying the NIC 109 is that, if the slave device identification information included in the received response is the virtual device identification information assigned to the server 103, the VM 116 will not transmit the packets due to not having received the response, even though the VM 116 recognizes that the packets will be relayed through the NIC 109 before being delivered to the VM 117.

The bus switch 107 controls switch circuits such as a crossbar switch included in the bus switch 107 to transfer the response to the determined port. The response is then output from the port determined at the bus switch 107.

The server 102 serving as a master is coupled to the determined port. Upon the response being output from the bus switch 107 to the server 103 serving as a master, the server 103 serving as a master receives this response, and thus the response is delivered to the VM 116.

The VM 116 which has received this response outputs the packets to the bus switch 107. An example of this packet overview is illustrated in FIG. 3A.

Upon receiving a packet including the device identification information to identify the NIC 109 serving as a slave, target MAC address, and source MAC address, the bus switch 107 confirms several bits worth after the device identification information of the slave included in the packet, up to where the target MAC address may be determined. The bus switch 107 then determines whether or not the target MAC address included in the packet corresponds to at least any of the target MAC addressees set by the administrative server 122. Now, an arrangement may be made here where whether or not the source target MAC address corresponds to any of the target MAC addressees set by the administrative server 122 is determined, and switching of the communication path is changed for each flow.

The bus switch 107 sets virtual device identification information of the slave to the packet, by replacing the device identification information of the slave included in the packet with the virtual device identification information corresponding to the target MAC address. For example, the bus switch 107 confirms that the VM 117 is being run on the server 103 based on the target MAC address, obtains the virtual device identification information set to the server 103 serving as a slave, and replaces the device identification information included in the packet with the virtual device identification information of the slave, for example. An example of this packet overview is illustrated in FIG. 3C.

The bus switch 107 then determines the port No. corresponding to the virtual device identification information of the slave included in the packet. The bus switch 107 controls switch circuits such as a crossbar switch included in the bus switch 107 to transfer the packets to the determined port. The packets are then output from the port determined at the bus switch 107.

The server 103 serving as a slave is coupled to the determined port. Upon the packet including the virtual device identification information of the slave being output from the bus switch 107 to the server 103 serving as a slave, the server 103 serving as a slave receives this response, and thus the response is delivered to the VM 117.

As described above, according to the present embodiment, the NIC virtualization device 105 serves as a relay device relaying packets by switching the communication path of packets in accordance with target MAC addresses. In the event that the packets are planned to be delivered to a target device coupled to the NIC virtualization device 105, the NIC virtualization device 105, which switches NICs serving as the output destination of packets in accordance with device identification information of NICs which are communication circuits transmitting packets to the network, does not output the packets to the NICs but to the target device. Thus, band limitation of the NICs is irrelevant, so packet communication efficiency improves.

Now, the L2 switch 106 may be included in the NIC virtualization device 105. In this case, the L2 switch 106 and NIC virtualization device 105 are integrated into a single device, so the configuration of the communication system 100 is simpler for the administrative server 122 to obtain communication flow information and set path changes.

Also, in the communication system 100 according to the present embodiment, the communication path 119 and communication path 120 are switched by the bus switch 107 according to target MAC addresses following settings by the administrative server 122, as illustrated FIG. 4 which will be described later. Further, while both the VM 116 and VM 118 have the VM 117 as a packet destination, whether to or not to go through the NICs may be determined in accordance with not only the target MAC address but also the source MAC address, following settings by the administrative server 122. This enables the administrative server 122 to set communication paths taking into consideration the priority of each communication flow, within the range of the capability of the bus switch 107.

Note that packets are transmitted from the NICs 108 through 111 to the network 12 and network 13 via the L2 switch 106, but this is the same as the communication path 19 described above, so description thereof will be omitted.

FIGS. 3A through 3C illustrate example of packets processing with the communication system according to the present embodiment. The examples of packets illustrated in FIGS. 3A through 3C are packets, notifications, responses, and so forth in the communication performed in the communication system 100 according to the present embodiment. Note that there are cases where information other than packets are included in FIGS. 3A through 3C, but the other information is omitted from illustration.

FIG. 3A illustrates an example of a packet, including slave device identification information, master device identification information, target MAC address, source MAC address, sequence No. of the packet, and data.

FIG. 3B illustrates another example of a packet, including target MAC address, source MAC address, sequence No. of the packet, and data.

FIG. 3C illustrates another example of a packet, including virtual device identification information of a slave, master device identification information, target MAC address, source MAC address, sequence No. of the packet, and data.

FIG. 4 illustrates an example of a time chart of the operation of the communication system according to the present embodiment. The time chart in FIG. 4 illustrates a case of the VM 116 running at the server 102 transmitting a packet [0] to the VM 117 running on the server 103 via the communication path 119, following which the communication path is switched to communication path 120, and packets [1] through [3] following the packet [0] are transmitted to the server 103 via the communication path 120. Note that this time chart is an example of communication described with reference to FIGS. 2 through 3C. The numbers in the brackets represent packet sequence Nos.

First, the packet [0] is output from the server 102 to the bus switch 107 included in the NIC virtualization device 105. Next, the packet [0] is output from the bus switch 107 to the L2 switch 106.

In operation 401, the L2 switch 106 detects the communication flow of packet [0] and transmits this to the administrative server 122 as communication flow information. The L2 switch 106 outputs the packet [0] to the bus switch 107. The bus switch 107 outputs the packet [0] to the server 103. Note that the L2 switch 106 may buffer the packet [0] until the communication flow is determined by the administrative server 122. In this case, in the event that the administrative server 122 determines in communication flow determinations that the packet [0] will not be sent to the server 103, the packet [0] is not output from the L2 switch 106 thereafter, so useless communication is omitted.

The administrative server 122 which has received the communication flow determines in operation 402 whether or not to switch the communication path, based on the communication flow information. Determination is made here whether or not the communication flow satisfies a standard for identifying a flow regarding which the communication path may be switched. The administrative server 122 instructs the server 103 to start the virtual NIC function 125. Further, the administrative server 122 instructs the bus switch 107 to switch the communication path.

The bus switch 107 which has received the communication path switching instruction starts packet buffering in operation 403. Accordingly, packet [1] and packet [2] which are output from the server 102 to the bus switch 107 after the packet [0] are not output to the L2 switch 106 but are buffered at the bus switch 107.

In operation 404 the bus switch 107 sets switching of the communication path. Once this is completed, in operation 405 the bus switch 107 releases the buffered packets. The packet [1] and packet [2] thus are output to the server 103 maintaining that order, without being output to the L2 switch 106.

Subsequently, the packet [3] output from the server 102 to the bus switch 107 is output to the server 103 without being output to the L2 switch 106, since the communication path has already been switched.

FIG. 5 illustrates an example of the hardware configuration of the administrative device according to the present embodiment. The administrative server 122, which is an example of an administrative device, includes a CPU 500, a memory controller 501, memory 502, a memory bus 503, an I/O bus controller 504, an NIC 505, and an I/O bus 506, with the I/O bus 506 being coupled to a storage device 507. The storage device 507 corresponds to the database 123 illustrated in FIG. 2.

The memory 502 coupled to the memory bus 503 stores programs to execute the various types of processing of the administrative server 122. The CPU 500 reads out the programs from the memory 502 via the memory controller 501, and executes the various types of processing. Data write/read is performed as to the memory 502 by the memory controller 501, as the various types of processing are executed by the CPU 500.

The CPU 500 transfers data to the NIC 505 coupled to the I/O bus 506 by way of the bus controller 504, and also receives data and packets from the NIC 505. The CPU 500 reads data out from the storage device 507 coupled to the I/O bus 506, by way of the I/O bus controller 504, and also writes data to the storage device 507.

The CPU 500 may include one or more CPU cores to execute various types of processing. Also, each CPU core may include one or more processors. An example of the memory 502 is dynamic random access memory (DRAM). The storage device 508 is non-volatile memory such as read only memory (ROM) or flash memory, or a magnetic disk such as a hard disk drive (HDD) or the like.

Note that the configuration where the CPU 500, main controller 501, memory 502, NIC 505, and storage device 507 are coupled to the same bus may be applied to the administrative server 122. The functional block illustrated in FIG. 6 is realized by the hardware configuration illustrated in FIG. 5, and the processing illustrated in FIG. 8 is executed.

Figure 6:
FIG. 6 illustrates an example of functional blocks of the administrative device according to the embodiment.

FIG. 6 illustrates a functional block of the administrative device according to the present embodiment. The administrative server 122, which is an example of an administrative device, functions as an obtaining unit 600, determining unit 601, and setting unit 602, by a program loaded to the memory 502 used as working memory being executed by the CPU 500. The processing executed by the functional blocks illustrated in FIG. 6 will be described later, in correlation with the processing illustrated in FIG. 8.

FIGS. 7A through 7D illustrate examples of information used by the administrative device according to the present embodiment. The administrative server 122, which is an example of an administrative device, stores in the database 123 illustrated in FIG. 2 the information illustrated in FIGS. 7A through 7D. This information is read out to the memory 502 illustrated in FIG. 5 as appropriate, and used for the processing illustrated in FIG. 8.

As illustrated in FIG. 7A, the administrative server 122 manages the correlation between device addresses and device identification information. The administrative server 122 has a function of a VM manager managing the VMs 116 through 118 being executed at the servers 102 through 104 illustrated in FIG. 2, as described earlier. The administrative server 122 gives the VMs 116 through 118 each MAC addresses for identification of the VMs 116 through 118 and manages the MAC addresses. These MAC addresses are examples of the device addresses illustrated in FIG. 7A.

Further, the administrative server 122 assigns the NICs 108 through 111 to the VMs 116 through 118 and the servers 102 through 104, and manages the NICs 108 through 111. The MAC addresses assigned to the VMs 116 through 118 and the device identification information of the NICs 108 through 111 assigned to the VMs 116 through 118 are managed by being correlated by the administrative server 122, as illustrated in FIG. 7A. For example, A device identified by the MAC address "00-90-27-AA-74-E0" is assigned a device identified by device identification information "#001". This correlation is managed by the administrative server 122, and illustrated in FIG. 7A.

FIG. 7B illustrates a change standard applied at the time of determining whether or not to change the communication path of a communication flow. This standard is applied at the time of determining whether or not a packet transmitted one of from the VMs 116 through 118 and servers 102 through 104 so as to be delivered to a target device, is to be routed through the NICs 108 through 111 and L2 switch 106 or may be detoured through the bus switch 107 instead of being routed through the NICs 108 through 111 and L2 switch 106.

FIG. 7B illustrates "00-90-27-AA-74-E0" which is the MAC address of a target device, serving as a target address, correlated with "00-90-27-BB-86-E2" which is the MAC address of a source device, serving as a source address, for example. Further, FIG. 7B illustrates the device of which the MAC address is "00-90-27-AA-74-E0" and the device of which the MAC address is "00-90-27-BB-86-E2" being devices operated by service provider A, which is correlated with the combination of the target address and source address. Now, if a communication flow is identified by "00-90-27-AA-74-E0" and "00-90-27-BB-86-E2" for example, this is an operation within the service provider A, so the administrative server 122 manages this communication flow as a communication flow which does not go through the NICs 108 through 111 and L2 switch 106, but rather where packets are delivered to the target device through the bus switch 107, as illustrated in FIG. 7B. Alternatively, the changing standard may be managed so that communication via internal wiring is not performed with devices between different service providers. Further, the standard in FIG. 7B may be managed in increments of groups of addresses allocated to service providers.

The administrative server 122 provides the servers 102 through 104 illustrated in FIG. 2 with virtual device identification information to identify the servers 102 through 104 as slave devices in communication over the bus which is internal wiring, so that the servers 102 through 104 can receive packets as slave device, and manages the virtual device identification information as illustrated in FIG. 7C. In a case where virtual device identification information of "#1001" is provided to a device of which the MAC address is "00-90-27-AA-74-E0" for example, these are correlated and managed by the administrative server 122 as illustrated in FIG. 7C.

FIG. 7D illustrates a correlation between a combination of addresses to identify a communication flow which is to be the subject of change of communication path, and virtual device identification information set at the time of changing the communication path. For example, in a case where a communication flow in which the target address is "00-90-27-AA-74-E0" and the source address is "00-90-27-BB-86-E2" as illustrated in FIG. 7B, is an object of communication path changing, the fact that the device identification information is to be converted by the virtual device identification information "#1001" correlated with "00-90-27-AA-74-E0" in FIG. 7C, is correlated and managed in FIG. 7D. The correlation illustrated in FIG. 7D is notified to the NIC virtualization device 105 whereby the NIC virtualization device 105 can identify communication flows to be subjected to communication path switching, and virtual device identification information can be set at the time of communication path switching.

FIG. 7D also illustrates that a communication flow of which the target address is "00-90-27-AA-74-E1" is subject to communication path switching for any source address, and that this is to be converted to virtual device identification information of "#1003", which is managed in a correlated manner. This stipulates that, as long as the target address is "00-90-27-AA-74-E1", the packets may be delivered to the target device via the bus switch 107 rather than being routed through the NICs 108 through 111 and L2 switch 106, regardless of the source device. On the other hand, this means that in a case of also identifying the source address in FIG. 7D, cases where packets may be delivered to the target device via the bus switch 107 rather than being routed through the NICs 108 through 111 and L2 switch 106, and cases otherwise, are stipulated differentially according to different source devices, even if the target device is the same.

If packets are delivered to the target device via the bus switch 107 rather than being routed through the NICs 108 through 111 and L2 switch 106, communication may be performed without influence of NIC band limitation, since the communication goes through internal wiring. However, there are limits on the processing capabilities of the NIC virtualization device 105, for example the processing capabilities in changing communication paths at the bus switch 107, so all communication flows may not go through the internal wiring. Accordingly, managing communication flows to be subjected to communication path changing by individual communication flows according to the source address allows communication flows to be subjected to communication path changing to be managed in detail so that the processing capabilities of the NIC virtualization device 105 are not exceeded, as illustrated in FIG. 7D.

Cancelling the combinations of addressees managed in FIG. 7D and setting these to the NIC virtualization device 105, or re-managing the address combinations and re-setting this to the NIC virtualization device 105, enables control of switching between cases where packets may be delivered to the target device via the bus switch 107 rather than being routed through the NICs 108 through 111 and L2 switch 106, and cases otherwise.

FIG. 8 illustrates an example of processing executed at the administrative device according to the present embodiment. The administrative server 122, which is an example of the administrative device, starts processing to set communication paths to the NIC virtualization device 105 at operation 800.

Operation 801 to obtain communication flow information is executed by the obtaining unit 600. The communication flow information obtained in operation 801 is communication flow information detected in operation 401 illustrated in FIG. 4 by the L2 switch 106 illustrated in FIG. 2. This communication flow information is notified from the L2 switch 106 to the administrative server 122, and thus is obtained in operation 801. Note that the communication flow information includes combinations of target device addresses and source device addresses included in the packets which the L2 switch 106 has received, for example. As a further example, the communication flow information includes a combination of the MAC address of the target device and the MAC address of the source device, and the communication flow can be distinguished by this combination.

The determining unit 601 executes operation 802 to determine whether or not a communication flow satisfies the communication path changing standard. In operation 802, a combination of target address and source address included in communication flow information obtained in operation 801 is identified, and whether or not the identified address combination satisfies the changing standard that is managed as illustrated in FIG. 7B is determined. If the standard is not satisfied, the flow advances to operation 807, and if satisfied, advances to operation 803.

Operation 803 to determine whether or not changing the communication path of the communication flow will exceed the processing capabilities of the relay device is executed by the determining unit 601. In operation 803, whether or not the processing capabilities of the NIC virtualization device 105 which is an example of a relay device will not be exceeded even if the communication flow corresponding to the communication flow information obtained in operation 801 is changed so as to go through the bus, which is internal wiring, is determined. This determination is made based on the number of communication flows of which the communication paths are already changed to go through the bus, and the total value of communication amount. This is because packet congestion will occur on the internal bus if communication paths are changed without taking into consideration the processing capabilities of the NIC virtualization device 105. If determined to exceed the processing capabilities, the flow advances to operation 807, and if determined to not exceed the processing capabilities, the flow advances to operation 804.

Operation 804 to determine whether or not to change the communication path for each communication flow is executed by the determining unit 601. In a case that communication paths are to be changed to the NIC virtualization device 105 which is an example of a relay device, determination is made in operation 804 whether the communication path is to be changed in accordance with both target address and source address as illustrated in FIG. 7D, that is to say whether the communication path is going to be changed in increments of individual communication flows, or whether the communication path will be change in accordance with the target address regardless of what address the source address is. If determination is made not to change the communication path in increments of individual communication flows, the flow advances to operation 805, and if determination is made to change the communication path in increments of individual communication flows, the flow advances to operation 806.

Note that operations 802, 803, and 804 correspond to operation 402 illustrated in FIG. 4.

Operation 805 to set the object of communication path changing to the relay device, using the target address of the communication flow, is executed by the setting unit 602. Operation 805 is processing to notify the NIC virtualization device 105 that the object of communication path changing will be identified by target address, in accordance with the correlation illustrated in FIG. 7D, and change the communication path to the NIC virtualization device 105 using the target address. In the event that the NIC virtualization device 105 obtains a packet in operation 805 for example, if the MAC address of the target device is "00-90-27-AA-74-E1" determination is made that this is an object of communication path changing regardless of the source address, and the device identification information of the received packet is converted to virtual device identification information of "#1003", as illustrated in FIG. 7D.

Operation 806 to set the object of communication path changing to the relay device, using the target address and source address of the communication flow, is executed by the setting unit 602. Operation 806 is processing to notify the NIC virtualization device 105 that the object of communication path changing will be identified by target address and source address, in accordance with the correlation illustrated in FIG. 7D, and change the communication path to the NIC virtualization device 105 using the target address and source address. In the event that the NIC virtualization device 105 obtains a packet in operation 806, and if the MAC address of the target device is "00-90-27-AA-74-E0" and the MAC address of the source device is "00-90-27-BB-86-E2" determination is made that this is an object of communication path changing, and the device identification information of the received packet is converted to virtual device identification information of "#1001", as illustrated in FIG. 7D. This conversion means that the received packet will not be output to a NIC but will be delivered via bus to the target.

Note that devices addresses subject to communication path changing are notified from the administrative server 122 to the NIC virtualization device 105 as exemplarily illustrated in FIG. 4, in operations 805 and 806.

Operation 807 to activate the virtual NIC function of the device corresponding to the target address is executed at the setting unit 602. Operation 807 is for activate the virtual NIC function of one of servers 102 through 104 so as to function as a slave device in communication over the bus which is internal wiring. Also, the device corresponding to the target address is notified of corresponding virtual device identification information in operation 807, in accordance with the information illustrated in FIG. 7C. Operation 807 corresponds to the virtual NIC function activation instruction notified form the administrative server 122 to the server 103, as exemplarily illustrated in FIG. 4.

Operation 808 to determine whether to continue the processing is executed by the determining unit 601. In the event that determination is made to continue, the flow advances to operation 801, and in the event that determination is made to not continue, the flow advances to operation 809 and processing to set communication paths to the NIC virtualization device 105 ends.

Figure 9:
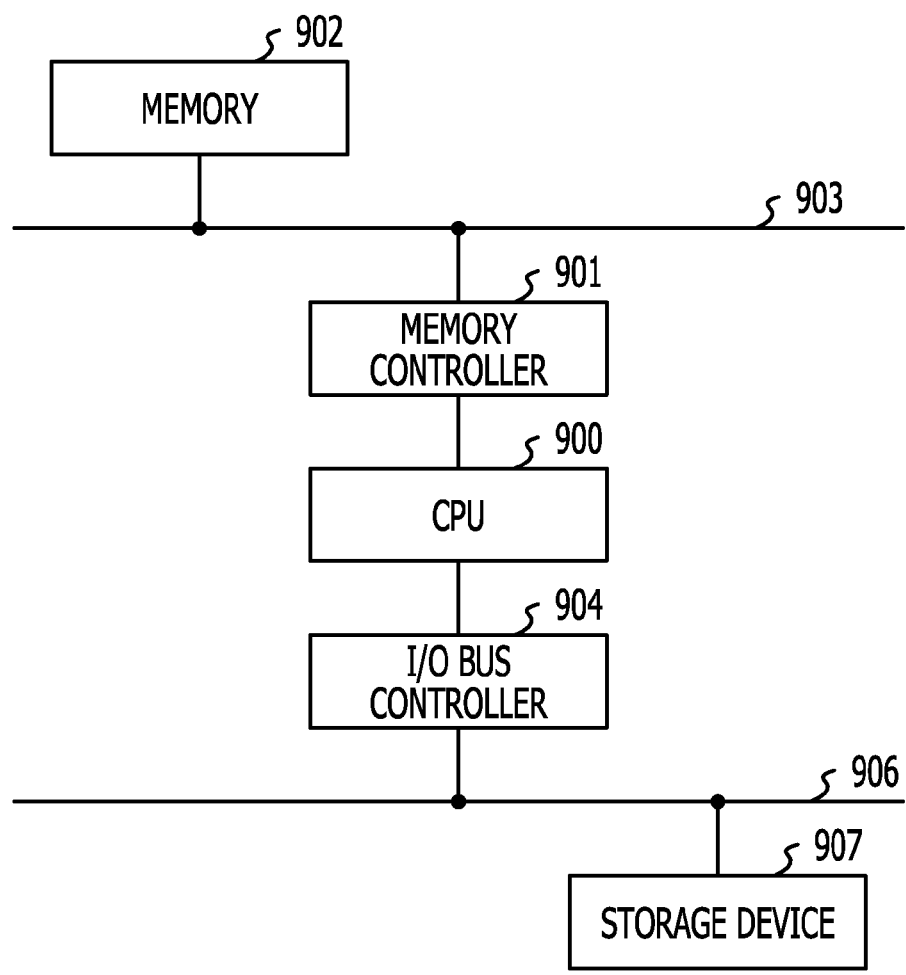
FIG. 9 illustrates an example of a hardware configuration of a server according to the embodiment.

FIG. 9 illustrates an example of the hardware configuration of a server according to the present embodiment. The servers 102 through 104 which are examples of servers include a CPU 900, a memory controller 901, memory 902, a memory bus 903, an I/O bus controller 904, and an I/O bus 906, with a storage device 907 coupled to the I/O bus 906.

The memory 902 coupled to the memory bus 903 stores programs to execute the various types of processing of the servers 102 through 104. The CPU 900 reads out the programs from the memory 902 via the memory controller 901, and executes the various types of processing. Data write/read is performed as to the memory 902 by the memory controller 901, as the various types of processing are executed by the CPU 900.

Packets of which the overview are illustrated in FIG. 3A are generated at the NIC virtualization device 105 coupled to the I/O bus 906, and output via the I/O bus controller 904 in accordance with processing of the CPU 900. Also, packets of configurations of which the overviews are illustrated in FIGS. 3A and 3C are received from the NIC virtualization device 105 via the I/O bus controller 904.

The CPU 900 reads out data from the storage device 907 coupled to the I/O bus 906 via the I/O bus controller 904, and also writes data to the storage device 907.

The CPU 900 may include one or more CPU cores to execute various types of processing. Also, each CPU core may include one or more processors. An example of the memory 902 is RAM such as DRAM. The storage device 907 is non-volatile memory such as ROM or flash memory for example, or a magnetic disk device such as an HDD or the like.

Note that the configuration where the CPU 900, memory controller 901, memory 902, and storage device 907 are coupled to the same bus may be applied to the servers 102 through 104. The functional block illustrated in FIG. 10 is realized by the hardware configuration illustrated in FIG. 9, and the processing illustrated in FIG. 11 is executed.

Figure 10:
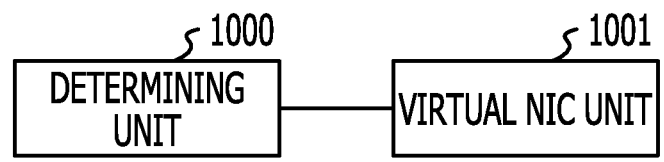
FIG. 10 illustrates an example of functional blocks of the server according to the embodiment.

FIG. 10 illustrates an example of a functional block of a server according to the present embodiment. The servers 102 through 104 which are examples of servers function as a determining unit 1000 and virtual NIC unit 1001, by a program loaded to the memory 902 used as working memory being executed by the CPU 900. The virtual NIC unit 1001 corresponds to the virtual NIC functions 124 through 126 and so forth, illustrated in FIG. 2. The processing executed by the functional blocks illustrated in FIG. 10 will be described later, in correlation with the processing illustrated in FIG. 11.

Figure 11:
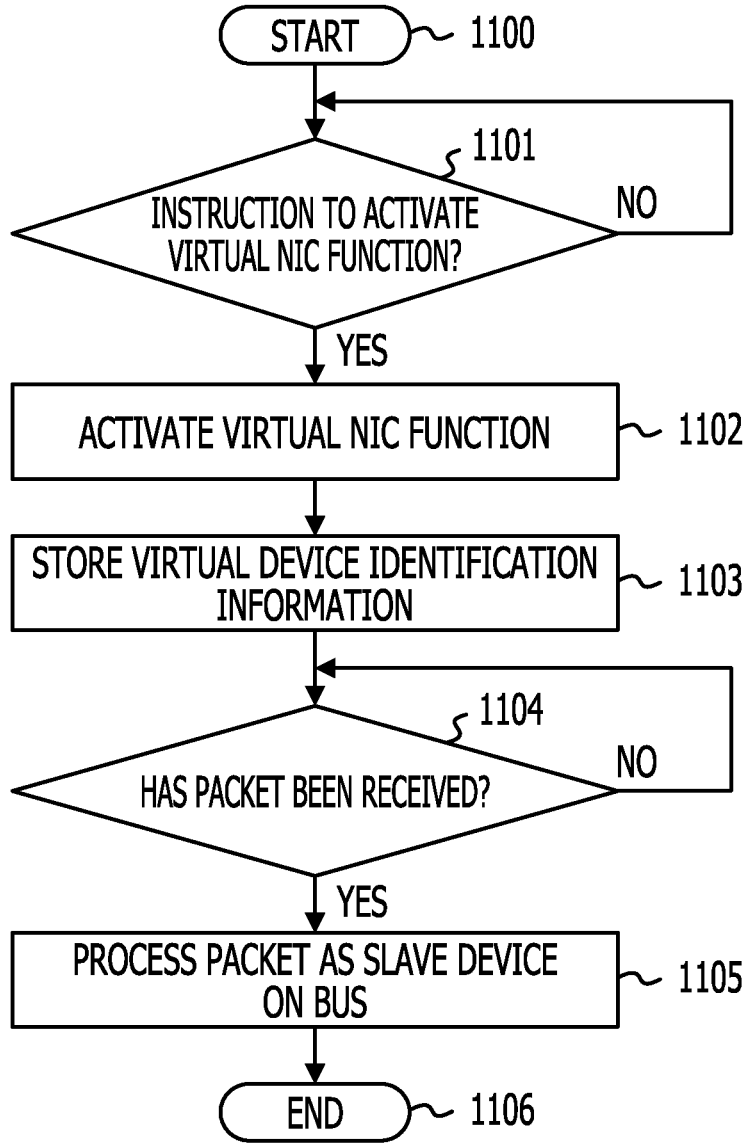
FIG. 11 illustrates an example of processing executed at the server according to the embodiment.

FIG. 11 illustrates an example of processing executed at a server according to the present embodiment. The series of processing illustrated in FIG. 11 is started at operation 1100.

Operation 1101 to determine whether or not there is an activation instruction for a virtual NIC function is executed by the determining unit 1000. Determination is made in operation 1101 regarding whether or not there is an activation instruction for the virtual NIC function, instructed from the administrative device in operation 807 illustrated in FIG. 8. In the event that there is no activation instruction for the virtual NIC function, the determination of operation 1101 is repeated to continue the processing, and in the event that there is an activation instruction for the virtual NIC function, the flow advances to operation 1102.

Operation 1102 to activate the virtual NIC function is executed by the virtual NIC unit 1001. Upon the virtual NIC function being activated in operation 1102 in response to the activation instruction from the administrative device, the servers 102 through 104 are able to function as slave devices in communication over the bus which is internal wiring when executing packet processing. For example, the servers 102 through 104 can perform processing to respond to a notification from a master device before packet transmission, to the effect that packets may be received.

Operation 1103 of storing virtual device identification information is executed by the virtual NIC unit 1001. The virtual device identification information notified from the administrative device along with the activation instruction is stored in memory 902 in operation 1103. The servers 102 through 104 are identified as slave devices in communication over the bus, in accordance with this virtual device identification information.

Operation 1104 to determine whether or not a packet has been received is executed by the determining unit 1000. In the event that determination is made that no packet has been received, the flow repeats operation 1104 to continue the processing. In the event that determination is made that a packet has been received, the flow advances to operation 1105.

operation 1105 to process packets as a slave device on the bus is executed by the virtual NIC unit 1001. Packets are processing in operation 1105 by the virtual NIC function activated in operation 1102, in accordance with the virtual device identification information stored in the memory 902 in operation 1103. The servers 102 through 104 operate as slave devices in communication on the bus in operation 1105. Upon the packet processing as slave devices ends, the series of processing illustrated in FIG. 11 ends in operation 1106.

Figure 12:
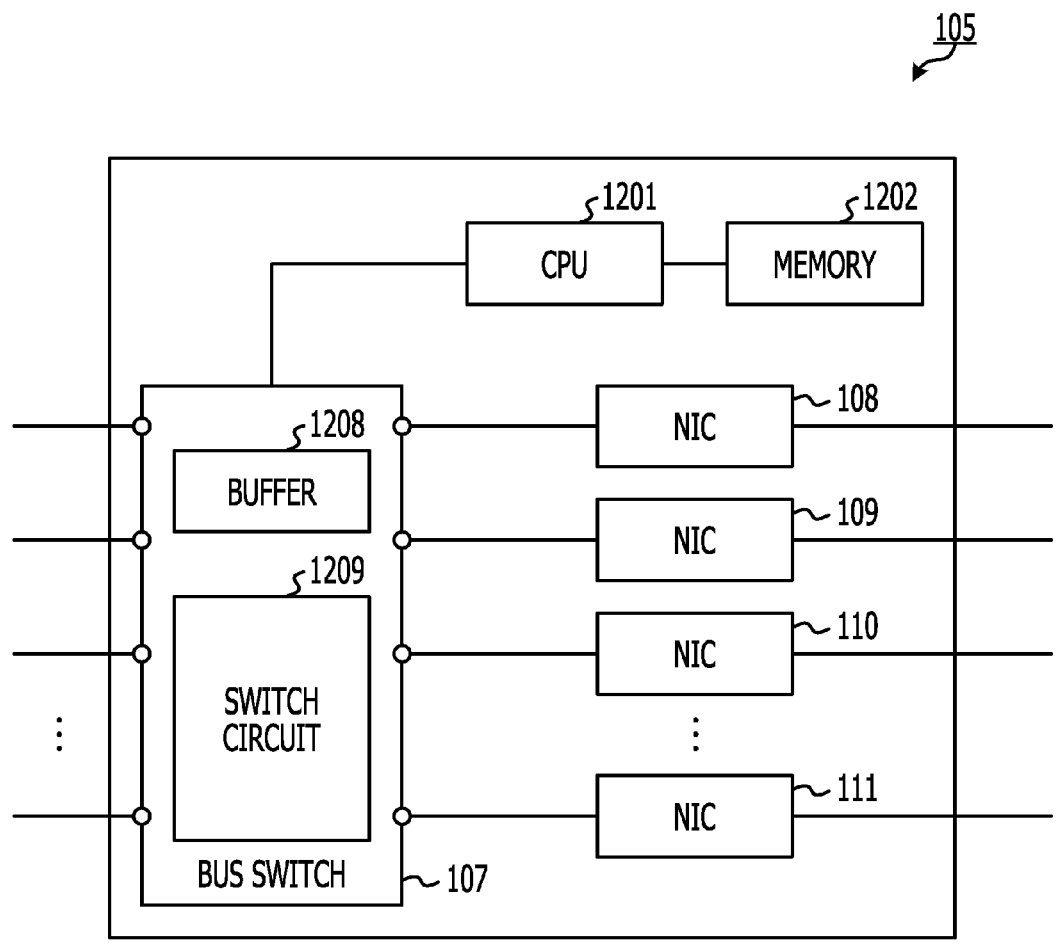
FIG. 12 illustrates an example of a hardware configuration of a relay device according to the embodiment.

FIG. 12 illustrates an example of the hardware configuration of the relay device according to the present embodiment. The NIC virtualization device 105 which is an example of a relay device includes a CPU 1201, memory 1202, a bus switch 107, and NICs 108 through 111 which are examples of communication circuits.

The memory 1202 stores programs to execute the various types of processing of the NIC virtualization device 105. The CPU 1201 reads out the programs from the memory 1202, and executes the various types of processing. Data write/read is performed as to the memory 1202, as the various types of processing are executed by the CPU 1201.

The CPU 1201 may include one or more CPU cores to execute various types of processing. Also, each CPU core may include one or more processors. An example of the memory 1202 is RAM such as DRAM.

The bus switch 107 includes a buffer 1208 and switch circuit 1209. Upon receiving a packet from any one of the multiple ports, the bus switch 107 stores this packet in the buffer 1208. The device identification information, target address, source address, and so forth of this packet are checked as described later, and a port of the switch circuit 1209 from which to output the packet is identified, by the CPU 1201 functioning as a controller. Upon identifying the port to output the packet, the CPU 1201 controls the switch circuit 1209 such that a transmission path is formed from the buffer 1208 to the port to output the packet, and the packet is output from the port. A crossbar switch may be used as an example of the switch circuit 1209, and I/O busses of the servers 102 through 104, and the NICs 108 through 111 are coupled to the ports of the switch circuit 1209 to which a crossbar switch has been applied.

The NICs 108 through 111 perform packet processing upon having received a packet of which the overview is illustrated in FIG. 3B, so as to become a packet of which the overview is illustrated in FIG. 3A, as described above, and execute communication with a network.

Figure 13:
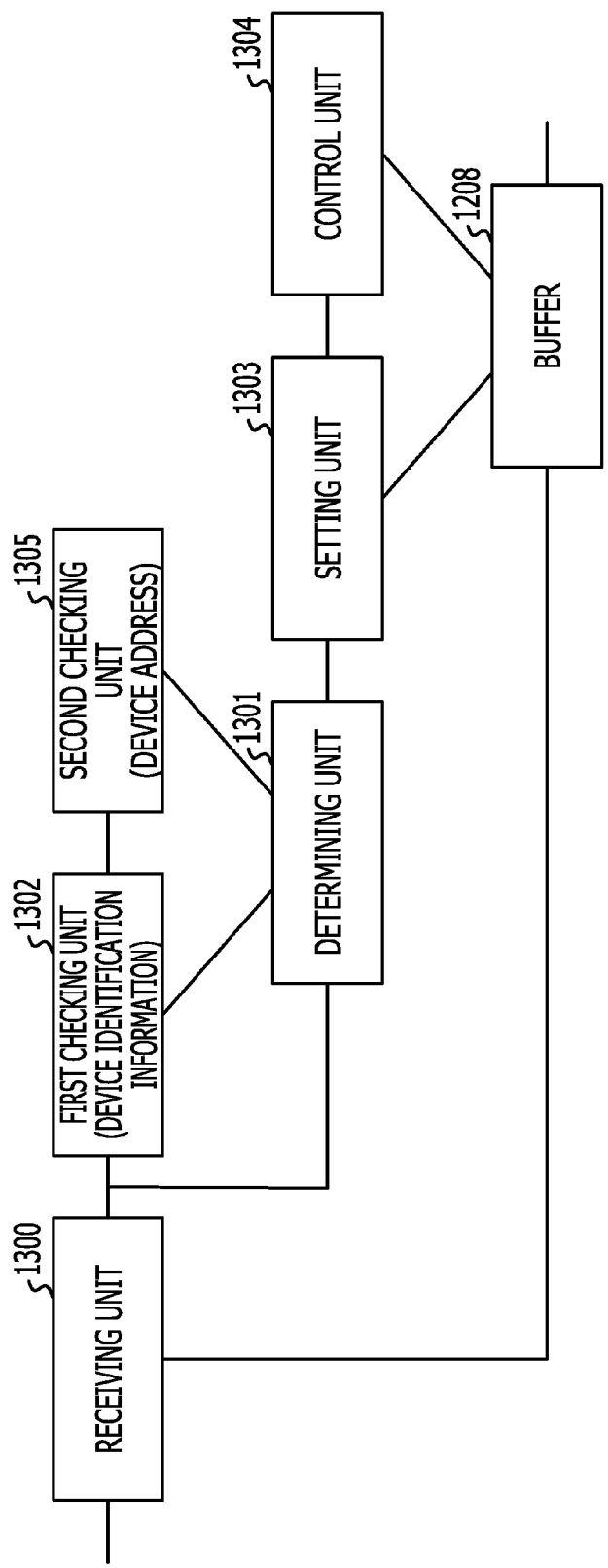
FIG. 13 illustrates an example of functional blocks of the relay device according to the embodiment.

FIG. 13 illustrates an example of a functional blocks of the relay device according to the present embodiment. The NIC virtualization device 105 which is an example of the relay device functions as a receiving unit 1300, a determining unit 1301, a first checking unit 1302 to identify device identification information, a setting unit 1303, a control unit 1304, and a second checking unit 1305 to check device addresses, by the CPU 1201 executing a program loaded to the memory 1202 used as working memory. Note that the buffer 1208 corresponds to the buffer illustrated in FIG. 12. The processing executed by the functional blocks illustrated in FIG. 13 will be described later in correlation with the processing illustrated in FIG. 15.

FIGS. 14A through 14C illustrate an example of information used at the relay device according to the present embodiment. The NIC virtualization device 105 which is an example of the relay device stores the information illustrated in FIGS. 14A through 14C in the memory 1202 illustrated in FIG. 12, and reads this out as appropriate to be used for the processing illustrated in FIG. 15.

FIG. 14A illustrates the correlation between device identification information which the administrative server 122 has assigned to the servers 102 through 104 and VMs 116 through 118, and the port Nos. of the bus switch 107 to which these devices are coupled. For example, a port No. "3" is correlated with the device identification information "#001". The bus switch 107 references the target device identification information included in the received packet, identifies the port No. to which this target is coupled, and outputs this packet from the port of the identified port No., in accordance with the correlation illustrated in FIG. 14A. Note that this device identification information is obtainable by handshake or the like with the coupled device.

FIG. 14B illustrates the relation between a combination of addresses to identify a communication flow to be subjected to communication path change, and virtual device identification information and device identification information to be set when changing the communication path. The correlation illustrated in FIG. 14B may be created by the correlation illustrated in FIG. 7D being notified to the NIC virtualization device 105 by the administrative server 122, and device identification information identified by handshake or the like being correlated therewith. The processing in which the correlation illustrated in FIG. 14B is used will be described with reference to FIGS. 15 and 16 described later.

FIG. 14C illustrates the correlation between the virtual device identification information which the administrative server 122 has assigned to the servers 102 through 104, and the port Nos. of the bus switch 107 coupled to the servers 102 through 104. For example, the virtual device identification No. "#1001" and the port No. "10" are correlated. The bus switch 107 references the virtual device identification information included in the received packet so as to identify the port No. and outputs this packet from the port of the identified port No., in accordance with the correlation illustrated in FIG. 14C. The correlation between the virtual device identification information and port No. can be created by the correlation between the device identification information and virtual device identification information being notified by the administrative server 122, and correlating the port No. identified by handshake or the like therewith.

Figure 15:
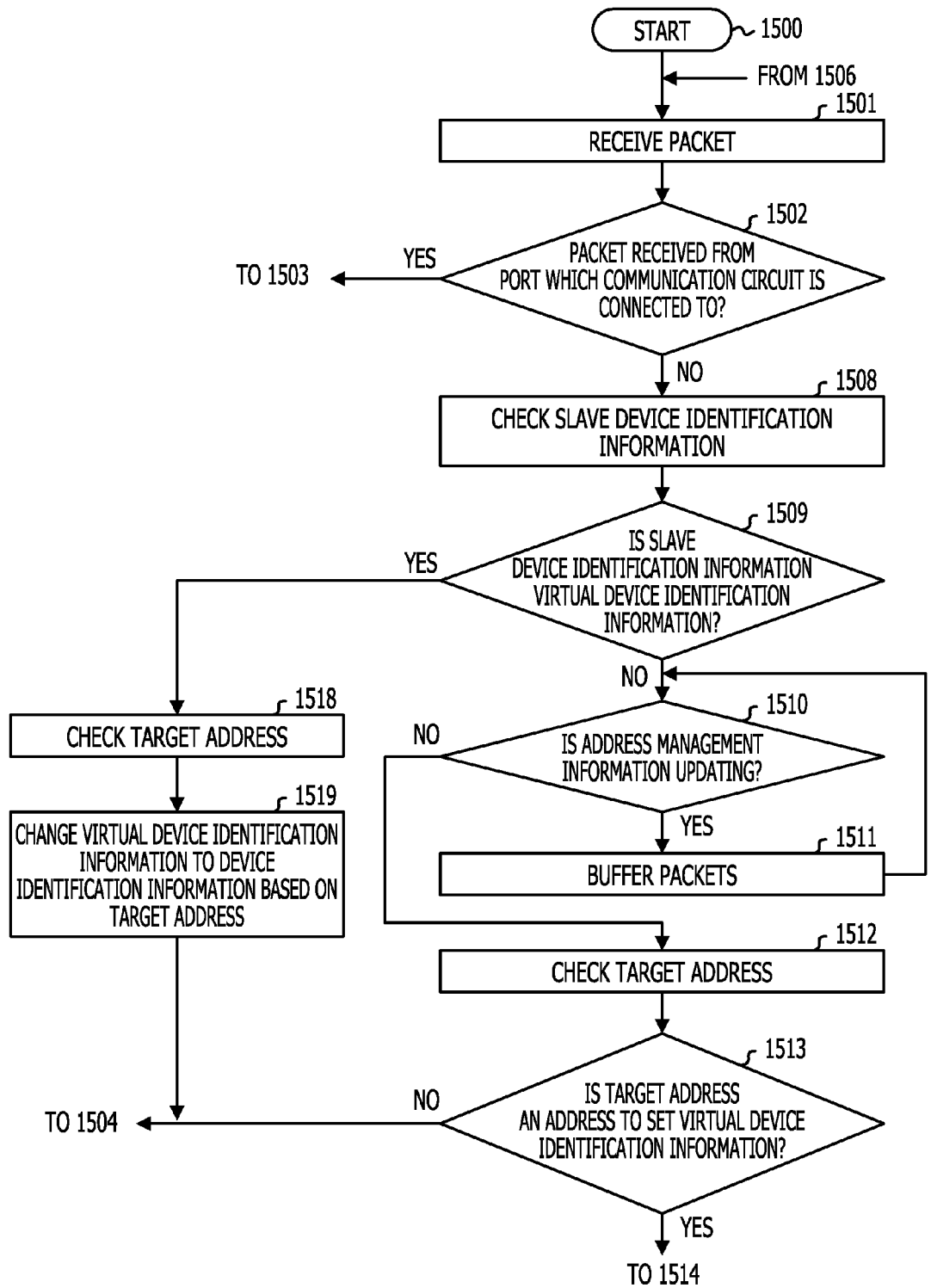
FIG. 15 illustrates an example of processing executed at the relay device according to the embodiment.
Figure 16:
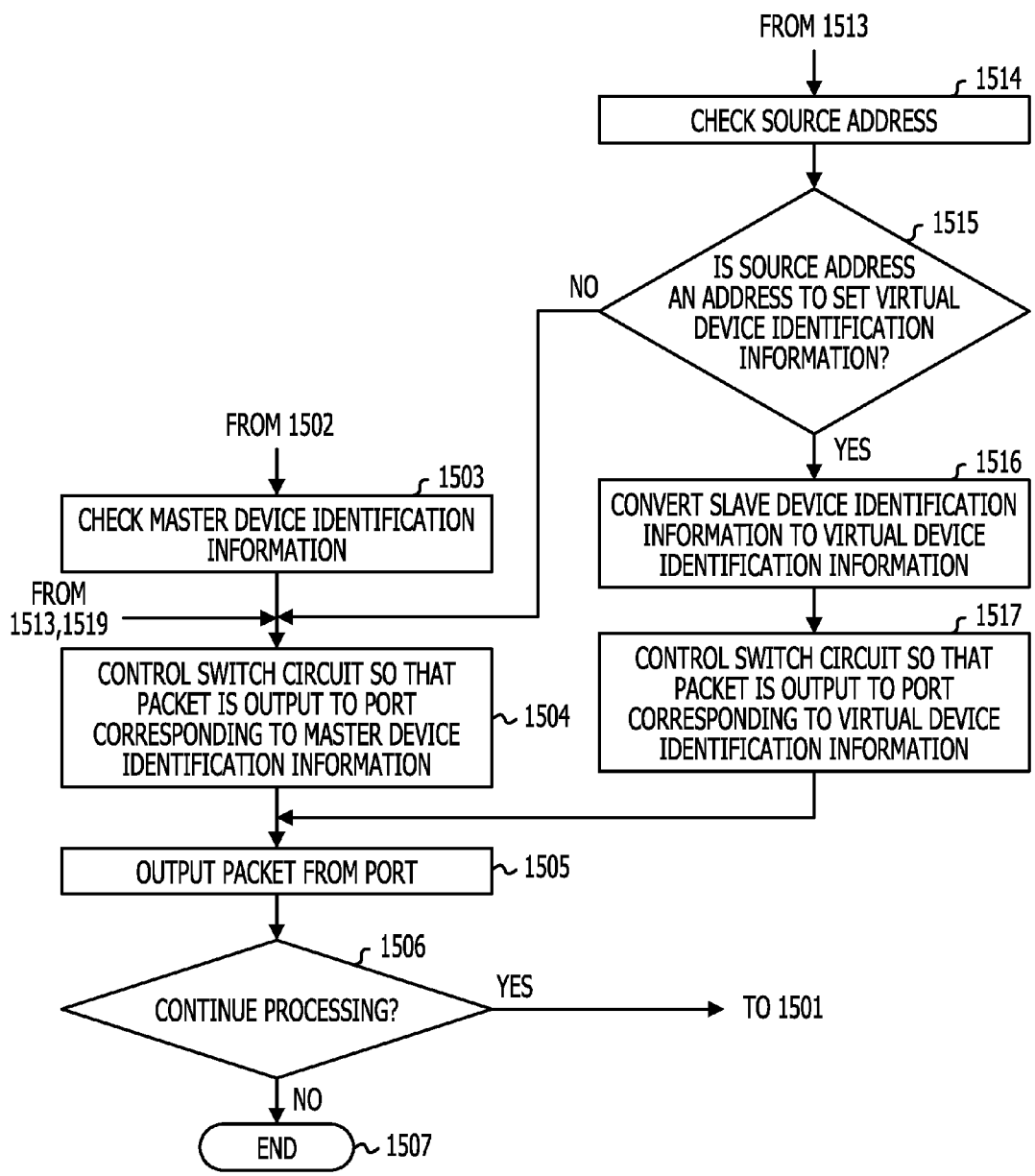
FIG. 16 illustrates an example of processing executed at the relay device according to the embodiment.

FIGS. 15 and 16 illustrate an example of processing executed at the relay device according to the present embodiment. The NIC virtualization device 105 which is an example of the relay device starts processing to set communication paths in operation 1500.

Operation 1501 to receive packets is executed by a receiving unit 1300. In operation 1501, packets transmitted from a source device serving as a master, packets transmitted from a target device serving as a slave, packets output from the NICs 108 through 111, and so forth, are received. These packets are buffered in a the buffer 1208 until the transfer path of the packets to the port for output is established. The configuration of the packets received in operation 1501 is the configuration of packets schematically illustrated in FIG. 3A or 3C.

Operation 1502 to determine whether or not a packet has been received from a port where a communication circuit is coupled, is executed at the determining unit 1301. In the event that a packet received by the bus switch 107 is not a packet output from the NICs 108 through 111 which are an example of communication circuits, the second checking unit 1305 executes processing to check device addresses in the processing illustrated in FIGS. 15 and 16. On the other hand, in the event that the packet is a packet output from the NICs 108 through 111 which are examples of communication circuits, checking of device addresses by the second checking unit 1305 does not have to be performed. Operation 1502 is executed for the above determination. In the event that determination is made that no packet has been received from a port to which a communication circuit is coupled, the flow advances to operation 1508, while in the event that determination is made that a packet has been received from a port to which a communication circuit is coupled, the flow advances to operation 1503.

Operation 1503 to check master device identification information is executed by the first checking unit 1302 which checks device identification information. In operation 1503, the bit string of the portion of the packet schematically illustrated in FIG. 3A which indicates the master device identification information is checked. This check identifies the master device which is the target of the packet.

Operation 1504 to control the switch circuit to output the packet to the port corresponding to the master device identification information is executed by the control unit 1304. In operation 1504, the port No. corresponding to the master device identification information checked in operation 1503 is obtained in accordance with the information illustrated in FIG. 14A. The control unit 1304 controls the switch circuit 1209 including a crossbar switch or the like, for example, to establish a transfer path to the port, so that the packet is transferred to the port of the obtained port No.

The control unit 1304 executes operation 1505 to output the packet from the port. Upon the transfer path being established to the port in operation 1504, in operation 1505 the control unit 1304 transfers the packet which had been buffered in the buffer 1208 to the port over this transfer path, and outputs the packet from this port to which the destination of the packet is coupled.

Operation 1506 to determine whether or not to continue processing is executed by the determining unit 1301. In the event that determination is made to continue processing, the flow returns to operation 1501, and in the event that determination is made not to continue processing, the flow advances to operation 1507, and the processing illustrated in FIGS. 15 and 16 ends.

In the event that determination is made in operations 1501 and 1502 that a packet has been received but not from a port to which a communication circuit is coupled, the first checking unit 1302 executes operation 1508 to check slave device identification information. The bit string of the portion of the packet which indicates the slave device identification information is checked in operation 1508.

The determining unit 1301 executes operation 1509 to determine whether or not the slave device identification information is virtual device identification information. Operation 1509 is performed to determine whether the slave device which has transmitted the packet is one of the servers 102 through 104 functioning as a slave device under virtual NIC functions 124 through 126, and whether the one of the servers 102 through 104 functioning as a slave has transmitted the packet with the virtual device identification information assigned by the administrative server 122 given to the packet as the slave device identification information of the packet, for later-described processing. In the event that determination is made that the slave device identification information is not virtual device identification information, the flow advances to operation 1510, and in the event that determination is made that the slave device identification information is not virtual device identification information, the flow advances to operation 1518.

The determining unit 1301 executes operation 1510 to determine whether or not address management information is being updated. The determining unit 1301 determines whether or not the address management information illustrated in FIG. 14B is being updated at the memory 1202 in operation 1510. The address management information is information used for determination to deliver packets to the target device over the bus without going through the NICs 108 through 111 as described above, and is updated in response to notifications from the administrative server 122. Accordingly, in the event that the address management information is being updated, the packet is buffered and transfer thereof is put on hold. In the event that determination is made that the address management information is being updated, the flow advances to operation 1511, and in the event that determination is made that the address management information is not being updated, the flow advances to operation 1512.

The buffer 1208 performs operation 1511 to buffer the packet. The buffer 1208 buffers the packet to hold transfer of the packet in operation 1511 in the event that the address management information is being updated. The flow loops from operation 1511 to operation 1510 to buffer the packet until updating of the address management information ends.

The second checking unit 1305 to check the device address executes operation 1512 to check the target address. In operation 1512, the bit string of the portion of the packet schematically illustrated in FIG. 3A indicating the address of the target device is checked. This checking identifies the MAC address of the target device, for example, as a target address.

The determining unit 1301 executes operation 1513 to determine whether or not the target address is an address to set virtual device identification information. The determining unit 1301 determines in operation 1513 whether or not the target address checked in operation 1512 matches the target address in the information indicated in FIG. 14B. If the target address matches the target address in the information indicated in FIG. 14B, this is taken as a candidate to set virtual device identification information to the packet. Operation 1513 is part of processing to determine whether or not the received packet is the object of being transferred through the bus at the bus switch 107 and delivered to the target device, instead of going through the NICs 108 through 111. In the event that determination is made that this is not an address to set virtual device identification information, the flow goes to operation 1504, and in the event that determination is made that this is an address to set virtual device identification information, the flow advances to operation 1514.

The second checking unit 1305 executes the operation 1514 to check the source address. In operation 1514 the second checking unit 1305 checks the bit string of the portion of the packet schematically illustrated in FIG. 3A indicating the address of the source device. This checking identifies the MAC address of the source device for example, as the source address.

The determining unit 1301 executes operation 1515 to determine whether or not the source address is an address to set virtual device identification information. The determining unit 1301 determines in operation 1515 whether or not the source address checked in operation 1514 matches the source address of the information illustrated in FIG. 14B. If this matches the source address of the information illustrated in FIG. 14B, virtual device identification information is set to the packet. Operation 1515 is part of processing to determine whether or not the received packet is the object of being transferred through the bus at the bus switch 107 and delivered to the target device, instead of going through the NICs 108 through 111. In the event that determination is made that this is not an address to set virtual device identification information, the flow goes to operation 1504, and in the event that determination is made that this is an address to set virtual device identification information, the flow advances to operation 1516.

The setting unit 1303 executes operation 1516 to convert the slave device identification information into virtual device identification information. The setting unit 1303 obtains, in operation 1516, virtual device identification information correlated with the target address in operation 1513 and the source address in operation 1515, in accordance with the information illustrated in FIG. 14B, and converts the bit string of the slave device identification information in the received packet into bit information corresponding to the obtained virtual device identification information. This conversion processing sets the virtual device identification information to the packet.

The control unit 1304 executes operation 1517 to perform switch circuit control, so as to output the packet to the port corresponding to the virtual device identification information. The control unit 1304 obtains, in operation 1517, the port No. corresponding to the virtual device identification information set in operation 1516, in accordance with the information illustrated in FIG. 14C. The control unit 1304 then controls the switch circuit 1209 including a crossbar switch or the like, for example, to establish a transfer path, so that the packet is transferred to the port of the obtained port No. Operation 1517 transfers the received packet to the slave target device to which the virtual device identification information has been assigned, via the bus at the bus switch 107, without going through the NICs 108 through 111. After operation 1517 ends, the flow goes to operation 1505.

In the event that determination is made in operation 1509 that the slave device identification information is virtual device identification information, the second checking unit 1305 executes operation 1518 to check the target address. A case where operation 1518 is executed is a case where determination has been made in the determination in operation 1509 that virtual device identification information is already set to the received packet even though the NIC virtualization device 105 has not converted the virtual device identification information. This corresponds to a case where one of the servers 102 through 104 serving as a slave has transmitted a packet to the NIC virtualization device 105. In this case, transferring the received packet to the device specified as the target in the packet in this state may result in the packet not being accepted in the communication over the bus, if the device specified as the target does not recognize the servers 102 through 104 functioning as slaves. Accordingly, in the event of receiving a packet in which virtual device identification information is already set, the NIC virtualization device 105 converts the virtual device identification information of the packet using NIC device identification information which the administrative server 122 assigned has to the device specified as the target, so that the device specified as the target in the packet can receive the packet. This is why the target address of the packet is checked in operation 1518.

The setting unit 1303 executes operation 1519 to convert the device virtual identification information into device identification information based on the source address. In operation 1519 the setting unit 1303 converts the bit string of the slave device identification information in the received packet in accordance with the NIC device identification information which the administrative server 122 has assigned to the device corresponding to the target address checked in operation 1518. This conversion processing sets device identification information based on the target address to the packet. After operation 1519 ends, the flow goes to operation 1504.

Now, an arrangement may be made where the administrative server 122 notifies the servers 102 through 104 of the correlation illustrated in FIG. 14B. In this case, the packet may be provided with virtual device identification information at the time of the servers 102 through 104 transmitting the packet. Accordingly, the packet may be transferred over the bus at the bus switch 107, assigned virtual device identification information, and delivered to the target device serving as a slave, without going through the NICs 108 through 111, even without any conversion processing at the NIC virtualization device 105.

However, multiple VMs are executed at the severs 102 through 104, and not all of these VMs may be operated by the same service provider, so setting virtual device identification information at the time of the packets being transmitted from the servers 102 through 104 may allow unauthorized packet communication to be performed between different service providers via the bus switch 107. Also, setting virtual device identification information at each of the servers 102 through 104 without taking into consideration the band of the bus, packet communication may exceed the band of the bus.

Accordingly, the arrangement where the servers 102 through 104 and VMs 116 through 118 which transmit packets transmit packets such as illustrated in FIG. 3A, and the administrative server 122 and NIC virtualization device 105 perform determination and processing of the conversion to virtual device identification information, enables the communication limitations and band usage to be controlled among service providers.

According to the embodiment described above, a relay device which switches communication circuits serving as packet output targets, in accordance with identification information of communication circuits transmitting packets to a network, does not output packets to the communication circuit but to the target device in a case where the packets are to be delivered to a target device coupled to the relay device. Thus, packet communication efficiency is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
   a first device which outputs a packet including an address identifying a second device and identifier of one of a plurality of communication circuits that output packets to a network, the first device having a first memory and a first processor coupled to the first memory; and
   a relay device which outputs the packet to the second device instead of to the one of the plurality of communication circuits corresponding to the identifier, when it is determined based on the address that the second device is coupled to the relay device, the relay device having a second memory and a second processor coupled to the second memory,
   wherein the address is included in a data portion of the packet and the identifier is included in a header portion of the packet,
   wherein at least a particular address of addresses identifying devices is set in the relay device, the devices coupled to an internal bus of the relay device,
   wherein the relay device:
   checks the identifier and the address,
   determines that the second device is coupled to the relay device through the internal bus when the checked address matches the particular address, and
   adds another identifier identifying the second device in a communication through the internal bus into the header portion instead of the identifier when the checked address matches the particular address,
   wherein the packet is output to the second device instead of to the one of the plurality of communication circuits based on the another identifier.

2. The communication system according to claim 1, wherein the identifier is assigned to the first device.

3. The communication system according to claim 1, wherein the relay device outputs the packet to the second device when it is determined that the second device coupled to the relay device and the address complies with a rule.

4. The communication system according to claim 3, wherein the relay device outputs the packet to the one of the plurality of communication circuits corresponding to the second device identifier when the address does not comply with the rule due to the rule changing.

5. The communication system according to claim 1, wherein the relay device outputs the packet to the second device when it is determined that the second device coupled to the relay device and an address of the first device complies with a rule.

6. The communication system according to claim 1, the relay device which detects the address following detection of the identifier, and determines based on the address that the second device is coupled to the relay device.

7. The communication system according to claim 6, wherein the relay device includes a crossbar switch coupled to a bus of the first device and a bus of the second device, and outputs the packet to the second device by controlling the crossbar switch.

8. The communication system according to claim 6, wherein the relay device converts the identifier to an identifier for identifying the second device.

9. The communication system according to claim 1; wherein the relay device buffers the packet before outputting the packet to the second device.

10. The communication system according to claim 1, wherein the identifier is removed when the packet is output to the network.

11. The communication system according to claim 1, wherein the second device is a physical server or a virtual machine.

12. The communication system according to claim 1, wherein a first band width of a communication path between the first device and the relay device is broader than a second band width of a communication path between the one of the plurality of communication circuits and the network.

13. The communication system according to claim 3, comprising:
   an administrative device which changed the rule.
14. The communication system according to claim 13,
   wherein the administrative device sets the rule for each communication flow based on the address of the target device and an address of the first device.
15. A relay device comprising:
   a memory; and
   a processor coupled to the memory and configured to execute a process, the process including:
   outputting a packet, which includes an address identifying a second device and an identifier of one of a plurality of communication circuits that output packets to a network, to the second device instead of to the one of the plurality of communication circuits corresponding to the identifier, when it is determined based on the address that the second device is coupled to the relay device,
   wherein the address is included in a data portion of the packet and the identifier is included in a header portion of the packet,
   wherein at least a particular address of addresses identifying devices is set in the relay device, the devices coupled to an internal bus of the relay device,
   wherein the relay device:
   checks the identifier and the address,
   determines that the second device is coupled to the relay device through the internal bus when the checked address matches the particular address, and
   adds another identifier identifying the second device in a communication through the internal bus into the header portion instead of the identifier when the checked address matches the particular address,
   wherein the packet is output to the second device instead of to the one of the plurality of communication circuits based on the another identifier.
16. A communication method comprising:
   outputting a packet, which includes an address identifying a second device and an identifier of one of a plurality of communication circuits that output packets to a network, to the second device instead of to the one of the plurality of communication circuits corresponding to the identifier, when it is determined based on the address that the second device is coupled to the relay device,
   wherein the address is included in a data portion of the packet and the identifier is included in a header portion of the packet,
   wherein at least a particular address of addresses identifying devices is set in the relay device, the devices coupled to an internal bus of the relay device,
   wherein the relay device:
   checks the identifier and the address,
   determines that the second device is coupled to the relay device through the internal bus when the checked address matches the particular address, and
   adds another identifier identifying the second device in a communication through the internal bus into the header portion instead of the identifier when the checked address matches the particular address,
   wherein the packet is output to the second device instead of to the one of the plurality of communication circuits based on the another identifier.
17. A non-transitory computer-readable recording medium having stored therein a program for causing a system to execute a process, the process comprising:
   outputting a packet, which includes an address identifying a second device and an identifier of one of a plurality of communication circuits that output packets to a network, to the second device instead of to the one of the plurality of communication circuits corresponding to the identifier, when it is determined based on the address that the second device is coupled to the relay device,
   wherein the address is included in a data portion of the packet and the identifier is included in a header portion of the packet,
   wherein at least a particular address of addresses identifying devices is set in the relay device, the devices coupled to an internal bus of the relay device,
   wherein the relay device:
   checks the identifier and the address,
   determines that the second device is coupled to the relay device through the internal bus when the checked address matches the particular address, and
   adds another identifier identifying the second device in a communication through the internal bus into the header portion instead of the identifier when the checked address matches the particular address,
   wherein the packet is output to the second device instead of to the one of the plurality of communication circuits based on the another identifier.
18. An apparatus comprising:
   a memory; and
   a processor coupled to the memory and configured to execute a process, the process including:
   set in a relay device at least a particular address of addresses identifying devices, the devices coupled to an internal bus of the relay device; and
   cause the relay device to output a received packet to a second device of the received packet instead of one of a plurality of communication circuits for outputting packets to a network when it is determined an address included in the received packet matches the particular address,
   wherein the address is included in a data portion of the received packet and an identifier of the one of a plurality of communication circuits is included in a header portion of the received packet,
   wherein the relay device:
   checks not only the identifier but the address, and
   adds another identifier identifying the target device in a communication through the internal bus into the header portion instead of the identifier when it is determined the address included in the received packet matches the particular address,
   wherein the received packet is output to the target device instead of to the one of the plurality of communication circuits based on the another identifier.

* * * * *